(12) United States Patent
Teyssandier et al.

(10) Patent No.: US 10,520,640 B2
(45) Date of Patent: Dec. 31, 2019

(54) METHOD AND SYSTEM FOR ADJUSTING SEISMIC SOURCE PILOT AND DRIVE SIGNALS USING MEASURED DATA

(71) Applicant: CGG SERVICES SAS, Massy (FR)

(72) Inventors: Benoit Teyssandier, Savigny-sur-Orge (FR); John James Sallas, Plano, TX (US)

(73) Assignee: CGG SERVICES SAS, Massy (FR)

( * ) Notice: Subject to any disclaimer, the term of this patent is extended or adjusted under 35 U.S.C. 154(b) by 309 days.

(21) Appl. No.: 15/589,235

(22) Filed: May 8, 2017

(65) Prior Publication Data

US 2017/0371070 A1 Dec. 28, 2017

Related U.S. Application Data

(60) Provisional application No. 62/353,631, filed on Jun. 23, 2016, provisional application No. 62/401,398, filed on Sep. 29, 2016.

(51) Int. Cl.
*G01V 1/38* (2006.01)
*G01V 13/00* (2006.01)

(52) U.S. Cl.
CPC ............... *G01V 13/00* (2013.01); *G01V 1/38* (2013.01); *G01V 1/3808* (2013.01)

(58) Field of Classification Search
CPC ......... G01V 13/00; G01V 1/3808; G01V 1/38
See application file for complete search history.

(56) References Cited

U.S. PATENT DOCUMENTS

| 4,472,794 A | 9/1984 | Chelminski |
| 4,616,352 A * | 10/1986 | Sallas ............... G01V 1/04 324/76.79 |
| 8,274,862 B2 | 9/2012 | Sallas |
| 8,619,497 B1 | 12/2013 | Sallas et al. |

(Continued)

FOREIGN PATENT DOCUMENTS

WO 2015170170 A3 5/2016

OTHER PUBLICATIONS

Extended European Search Report in corresponding European Application No. EP 17 30 5714 dated Nov. 30, 2017.

(Continued)

*Primary Examiner* — Ian J Lobo
(74) *Attorney, Agent, or Firm* — Patent Portfolio Builders PLLC

(57) ABSTRACT

Computing device, software and method for calibrating pilot and drive signals of a marine seismic source array using measured data. The method includes receiving a source array geometry and a model of the source array; estimating an initial overall response of the source array based on numerical simulations, the model of the source array, and the source array geometry; generating the pilot and drive signals for the source array based on the initial overall response; determining individual responses of the source elements, which form the source array, based on the source array geometry, the model of the source array, and first measured data; calculating an actual overall response of the source array based on the pilot and drive signals, the model of the source array and second measured data; and adjusting the pilot and drive signals based on the actual overall response of the source array.

20 Claims, 16 Drawing Sheets

(56) References Cited

U.S. PATENT DOCUMENTS

| | | |
|---|---|---|
| 8,830,794 B2 | 9/2014 | Ruet et al. |
| 9,482,765 B2 | 11/2016 | Sallas et al. |
| 2010/0322028 A1 | 12/2010 | Tenghamn |
| 2013/0100766 A1 | 4/2013 | Ruet et al. |
| 2014/0043937 A1 | 2/2014 | Teyssandier et al. |
| 2014/0204701 A1 | 7/2014 | Teyssandier |
| 2014/0241116 A1 | 8/2014 | Sallas et al. |
| 2014/0247697 A1 | 9/2014 | Bagaini |
| 2014/0369162 A1 | 12/2014 | Teyssandier et al. |

OTHER PUBLICATIONS

Office Action in European Application No. 17 305 714.2 dated Jul. 23, 2018. (All references not cited herewith have been previously made of record.).

\* cited by examiner

METHOD AND SYSTEM FOR ADJUSTING SEISMIC SOURCE PILOT AND DRIVE SIGNALS USING MEASURED DATA

BACKGROUND

Technical Field

Embodiments of the subject matter disclosed herein generally relate to methods and systems and, more particularly, to mechanisms and techniques for adjusting pilot and drive signals of a marine seismic source array using, in addition to other elements, measured data.

Discussion of the Background

The oil and gas industry uses geophysical prospecting techniques in the search for, or characterization of, subterranean hydrocarbon reservoirs and/or other mineral deposits. In marine seismic prospecting, a seismic source is used in a body of water to generate a seismic signal that propagates into the earth and is at least partially reflected by subsurface seismic reflectors. The reflections are recorded by seismic sensors located at the bottom of the sea or in a body of water at a known depth, and the resulting seismic data may be processed in order to evaluate the location and depth of the subsurface reflectors.

For many years, air gun sources (also known as impulsive sources) have been used in marine seismic acquisition to impart seismic waves into the earth. The use of an impulsive energy source can cause certain safety and environmental concerns. An alternative to air gun sources are marine vibrators, which can emit a wide variety of signal types, for example, a long tone with changing frequency (sweep signal) or a stationary, band-limited, signal such as a pseudo-random signals or other types of signals. Multiple marine vibrators can be configured to operate as source arrays to increase overall output, and/or to preferentially direct the energy to a desired underground location. The instantaneous pressure resulting from a marine vibrator source array will be lower than that of an air gun array, but the total acoustic energy transmitted by the vibrator source array will be quite similar to the air gun array, due to the extended duration of the signal.

However, as the marine vibrators are operated in arrays (source array), they experience mutual impedance loading effects for a variety of reasons, for example, other vibratory elements in the source array, surface ghost reflections and/or in some cases, water bottom reflections. Not all these loading effects are completely predictable beforehand, i.e., not all these effects can be anticipated based on numerical simulations of the source array. Also, the actual depth of deployment of the source array may deviate from what is anticipated and/or individual marine vibrators may not perform as expected due to manufacturing tolerances and/or time in service, both of which will also affect the source array response.

Thus, although the pilot and driving signals for the marine vibrator array are currently estimated by numerical analysis prior to the actual seismic acquisition data, when in the field, the marine vibrator elements and the entire array behave differently than their anticipated behavior. This actual behavior of the source array, if left uncorrected, may result in a significant discrepancy in performance, which may increase the likelihood of acquiring poor seismic data.

Thus, there is a need for adjusting the calculated pilot and drive signals for a vibratory source array so that the acquired seismic data describes as accurately as possible the surveyed subsurface.

SUMMARY

According to one embodiment, there is a method for calibrating pilot and drive signals of a marine seismic source array using measured data. The method includes receiving a source array geometry and a model of the source array; estimating an initial overall response of the source array based on numerical simulations, the model of the source array, and the source array geometry; generating the pilot and drive signals for the source array based on the initial overall response; determining individual responses of the source elements, which form the source array, based on the source array geometry, the model of the source array, and first measured data; calculating an actual overall response of the source array based on the pilot and drive signals, the model of the source array and second measured data; and adjusting the pilot and drive signals based on the actual overall response of the source array.

According to another embodiment, there is a controller for calibrating pilot and drive signals of a marine seismic source array using measured data. The controller includes an interface configured to receive a source array geometry and a model of the source array, and a processor connected to the interface. The processor is configured to estimate an initial overall response of the source array based on numerical simulations, the model of the source array, and the source array geometry; generate the pilot and drive signals for the source array based on the initial overall response; determine individual responses of the source elements, which form the source array, based on the source array geometry, the model of the source array, and first measured data; calculate an actual overall response of the source array based on the pilot and drive signals, the model of the source array and second measured data; and adjust the pilot and drive signals based on the actual overall response of the source array.

According to still another embodiment, there is a non-transitory computer-readable medium storing instructions, which when executed by a processor, implement the method discussed above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a marine source array that includes plural vibrators that generate acoustic energy in a marine environment. However, the embodiments to be discussed next are not limited to a marine source element; they may be applied to other source arrays.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a signal adjusting process for driving a seismic source array includes a step of selecting (or computing or modifying) a source element control reference signals (pilot and drive signals) that not only takes into account constraints imposed by the anticipated operating environment that are known a priori, but also uses empirical measurements (measured data) made in situ to further determine the appropriate pilot and drive signals.

Figure 1:
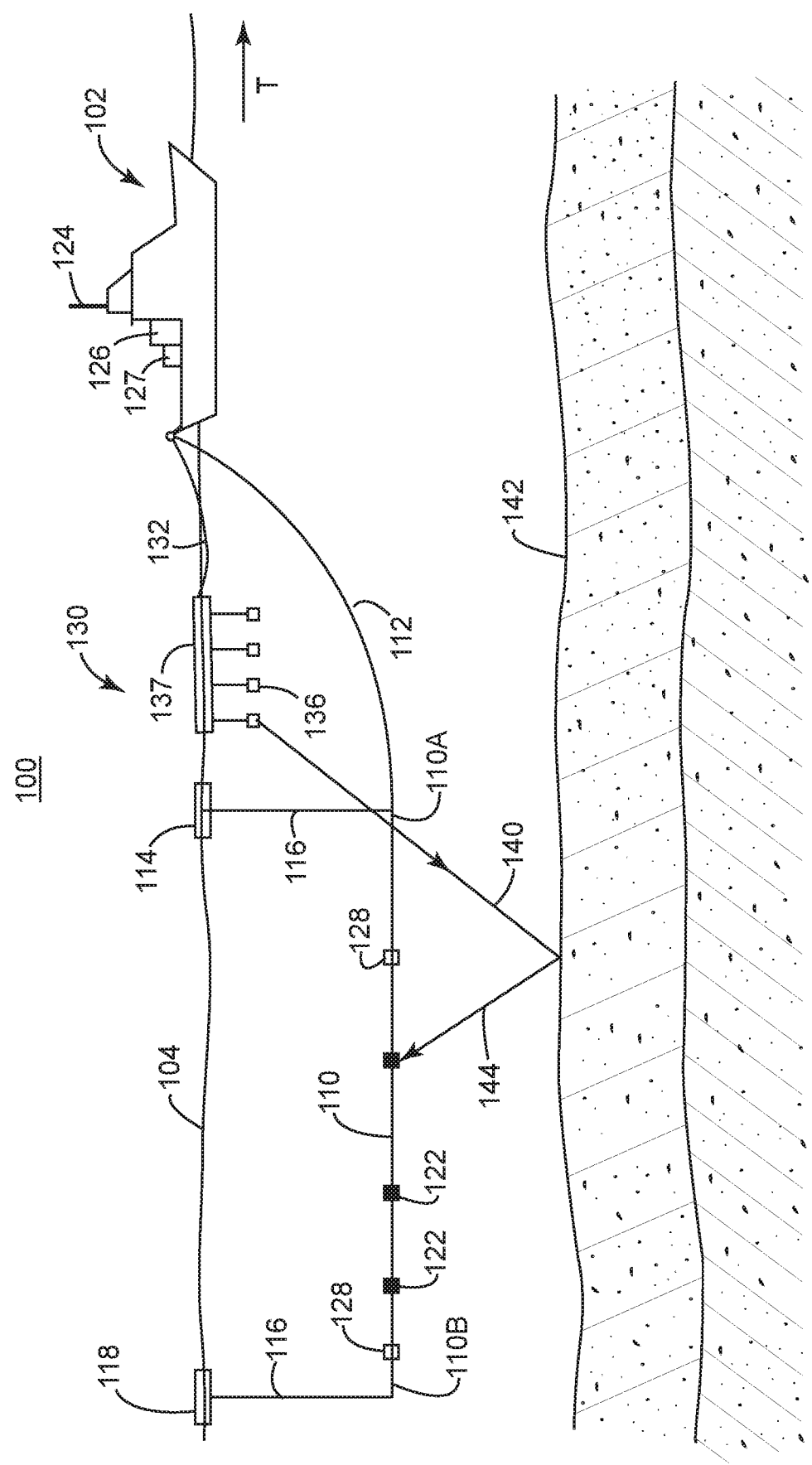
FIG. 1 is a schematic diagram of a seismic acquisition system.

Before explaining the details of this process, a seismic survey system 100, as illustrated in FIG. 1, is presented. System 100 includes a vessel 102 that tows plural streamers 110 (only one is visible in the figure) and a seismic source 130. Streamer 110 is attached through a lead-in cable (or other cables) 112 to vessel 102, while source array 130 is attached through an umbilical 132 to the vessel. A head float 114, which floats at the water surface 104, is connected through a cable 116 to a head end 110A of streamer 110, while a tail buoy 118 is connected, through a similar cable 116, to a tail end 110B of streamer 110. Head float 114 and tail buoy 118 are used, among other things, to maintain the streamer's depth. Seismic sensors 122 are distributed along the streamer and are configured to record seismic data. Seismic sensors 122 may include a hydrophone, geophone, accelerometer, or a combination thereof. Positioning devices (birds) 128 are attached along the streamer and controlled by a controller 126 for adjusting a position (vertical, lateral or both) of the streamer according to a survey plan.

Source array 130 has plural source elements 136, which typically are air guns. However, in the following, the source elements are considered to be marine vibrators. A vibratory source element is described in U.S. Pat. No. 8,830,794, and an impulsive source element is described in U.S. Pat. No. 4,472,794, the entire contents of which are incorporated herein by reference.

The source elements are attached to a float 137 to travel at desired depths below the water surface 104. During operation, vessel 102 follows a predetermined path T while source elements 136 emit seismic waves 140. These waves bounce off the ocean bottom 142 and other layer interfaces below the ocean bottom 142 and propagate as reflected/refracted waves 144 that are recorded by sensors 122. The positions of both the source element 136 and recording sensor 122 are estimated based on GPS systems 124 and recorded together with the seismic data in a storage device 127 onboard the vessel. Controller 126 has access to the seismic data and may be used to achieve quality control or even full processing of this data. Controller 126 may be also connected to the vessel's navigation system and other elements of the seismic survey system, e.g., birds 128.

Figure 2:
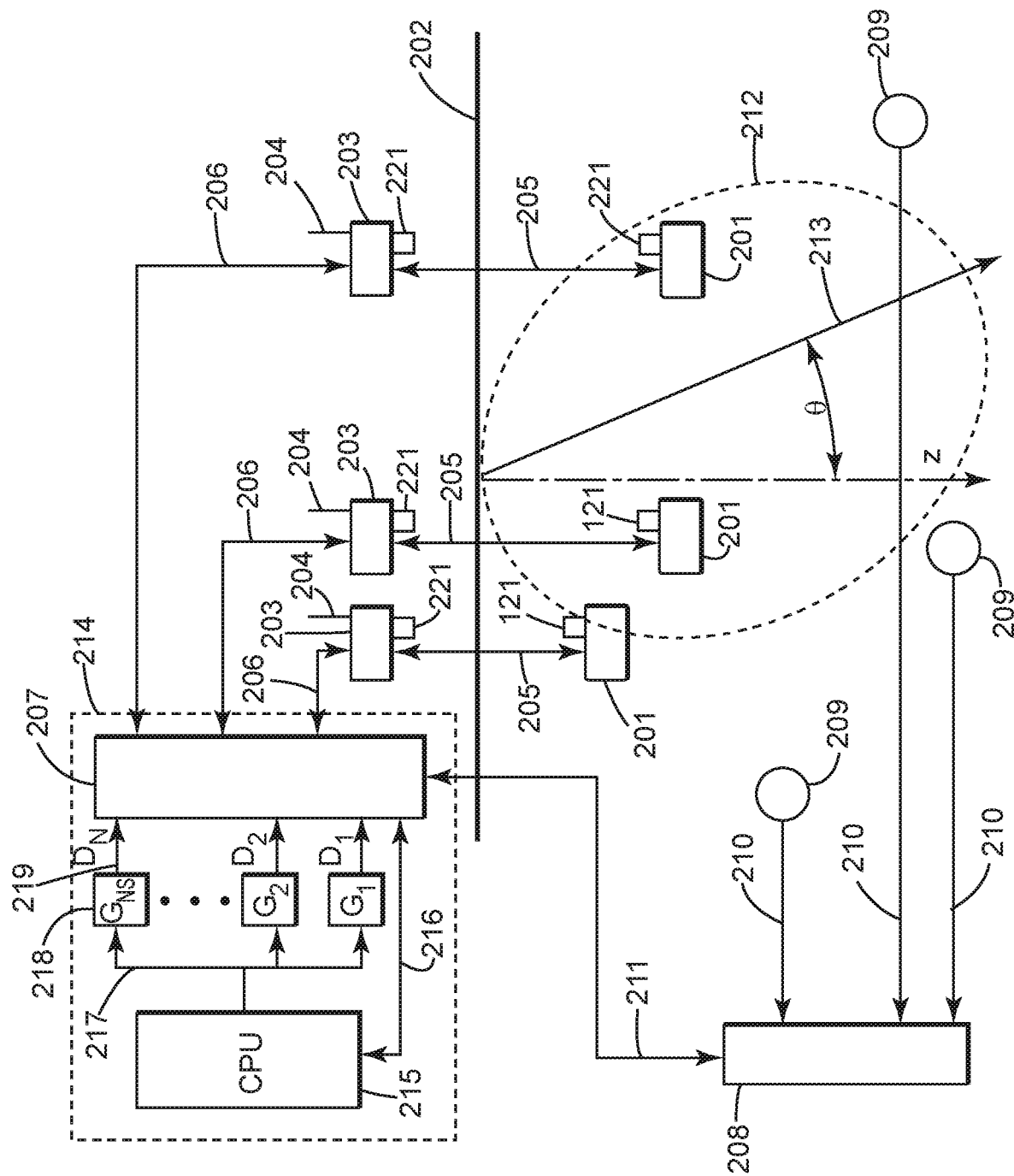
FIG. 2 is a schematic diagram of a marine vibrator source array having a drive signal adjustment system.

FIG. 2 schematically illustrates controller 126 (or array manager 214), which is configured to adjust the pilot and/or drive signals of the source array. Although FIG. 2 shows this controller to be located on the vessel, in one application, the controller may be distributed to the source elements or distributed between the vessel and the source elements.

In an embodiment, the components of the controller 126 are interconnected to form a system network that achieves one or more of the following functions: monitor marine vibrator individual and combined outputs, and use measured data to adjust the source array's pilot signal 217 and drive signals ($D_1$, $D_2$, ... $D_{Ns}$) 219 to help achieve survey objectives, where $N_s$ is the number of source elements of a given source array.

The source elements (e.g., marine vibrators) 201 are positioned at various depths (however, the source elements may be positioned at the same depth in other embodiments) below the sea surface 202. The marine vibrators 201 are assumed to be suspended from a surface float or vessel (not shown) that is equipped with a marine vibrator interface unit 203 and a GPS receiver 204. Other configurations are possible, for example, in an embodiment in which multiple marine vibrators are mechanically linked together and towed behind a survey or source vessel along with receivers located in streamers as discussed with regard to FIG. 1. In another example, it is possible to have the marine vibrators towed by small, self-propelled vessels. This would give more flexibility in positioning the sources.

Marine vibrator interface units 203 are in two-way communication with source elements 201 through the marine vibrator controller contained within source elements 201. Marine vibrator interface units 203 are also in two-way communication with the array manager 214, via communication interface module 207. Within array manager 214, there is a computing device 215 that is also in two-way communication with communication interface module 207. To monitor the source array output, receivers 209, for example hydrophones, are located at given depths and connected to a receiver acquisition system 208 through cables or other means 210. Receivers 209 may also be attached to the source array. Receiver acquisition system 208 is configured to receive and store the recorded emissions of the source elements. Receiver acquisition system 208 is in two-way communication with array manager 214 through communication pathway 211.

In an embodiment, array manager 214 and receiver acquisition system 208 are located on a surface vessel (e.g., vessel 102 in FIG. 1) that also contains a command and control unit for remote positioning and operation of the surface unmanned vessels from which source elements 201 may be suspended. Receiver acquisition system 208 may be equipped with a GPS receiver (not shown) to provide record file time stamps and/or receiver 209 positions.

In another embodiment, information from additional receivers (not shown) that are used to record the seismic survey data can be utilized, for example, receivers located in towed streamers, in ocean bottom nodes and/or ocean bottom streamers. Data from these additional receivers can be acquired and communicated to array manager 214 in real time and/or in some cases, sometime later, if the need for source array adjustment is infrequent.

In an embodiment, receivers 209 could be towed by semi-autonomous vessels and in that case, the receiver acquisition system 208 would be a distributed system, but still in communication with array manager 214, either in real time or delayed. In still another embodiment, components 205, 206 and 211 may be umbilicals that not only contain cables for communication, but also means for delivering power that can be electric, pneumatic and/or hydraulic in nature.

In one application, source elements 201 and source element interface unit 203 are also equipped with underwater location detection equipment 221. For example, information from an ultrasonic transceiver system similar to what is currently available for streamer location detection (Nautilus by Sercel) can be integrated with surface GPS coordinates to determine the location of each source element. The source element's location can be passed to the array manager 214 through the communication interface module 207.

The drive signal 219 provides a reference signal to the input of each source element's controller and is representative of the desired output of that particular source element. For purposes of this description, the output of each source element is understood to be the acoustic piston acceleration relative to the housing or enclosure of the source element. The acoustic piston acceleration is representative of the volumetric acceleration of a monopole source element, which for small source elements, is representative of the resultant far-field pressure in a free-field. In other embodiments, other signals, for example, acoustic piston velocity, or a signal from a near-field hydrophone, may be used to represent the output of a source element. The choice of output, in part, depends upon the design of the source element.

In an embodiment, the pilot signal 217 is convolved with filters $G_1, G_2 \ldots G_{Ns}$ 218 to form drive signals 219 $D_1, D_2 \ldots, D_{Ns}$ that can be downloaded, into source elements' local controllers, via pathway 207, 206, 205 to source element 201. These signals are then used to emit a seismic signal in a preferred direction 213 with a directivity pattern represented by 212. In this case, the preferred direction 213 is shown at angle θ with respect to downward vertical direction z.

The pilot signal 217 can be considered to approximate, represent and/or be proportional to the combined volumetric acceleration output of the source array. In some cases, the drive signals 219 can all be identical to the pilot signal 217, but in most cases, the drive signals are different than the pilot signal. For example, it may be desirable to alter the directivity pattern of the source array so that each drive signal may resemble a time-shifted version of the pilot signal. In another embodiment, each drive signal may be a phase perturbed and/or amplitude perturbed version of the pilot signal, depending upon the desired directivity pattern of the source array, the geometry of the array, operating environmental constraints and so on. In still another embodiment, filters 218 ($G_1, G_2 \ldots G_{Ns}$) are computed and updated by the source array manager 214 using models in combination with measured data from receivers 209 and sensors located within or near source element 201.

Once the seismic data has been acquired with the seismic receivers distributed on the streamers or ocean bottom nodes, this data can be cross-correlated with a correlation operator to compress the recorded seismic data so that the correlated record has the appearance of a record that looks more like one created by using an impulsive source, which makes it easier to identify reflection arrivals. In an embodiment, the correlation process is performed in the field, during the survey acquisition process, for quality control (QC) purposes. In another embodiment, pilot signal 217 is used as the correlation operator. In still another embodiment, the correlation operator is derived based on pilot signal 217, whose phase matches that of the pilot, but whose amplitude spectrum is modified to create a flat spectrum or a shaped spectrum for the purpose of reducing correlation side-lobes in correlated data sets and/or to improve image resolution. In still another embodiment, the pilot signal may be used as a source signature in processing if signature deconvolution is applied. In a different embodiment, both the phase and amplitude spectrum of pilot signal 217 may be modified to form a minimum phase correlation operator which, when used to cross-correlate the recorded seismic data, produces reflection event wavelets with greatly reduced precursor side-lobes.

As was mentioned before, the embodiments discussed herein are directed to a vibratory source array, but they could be modified to also work for impulsive sources. For example, to adjust the timing of the air guns in a source array, if an impulsive source is used, filters 218 could just be adjustable time delays and the amplitude and spectral output could be modified by adjusting the air pressure used to charge the airgun.

Figure 3:
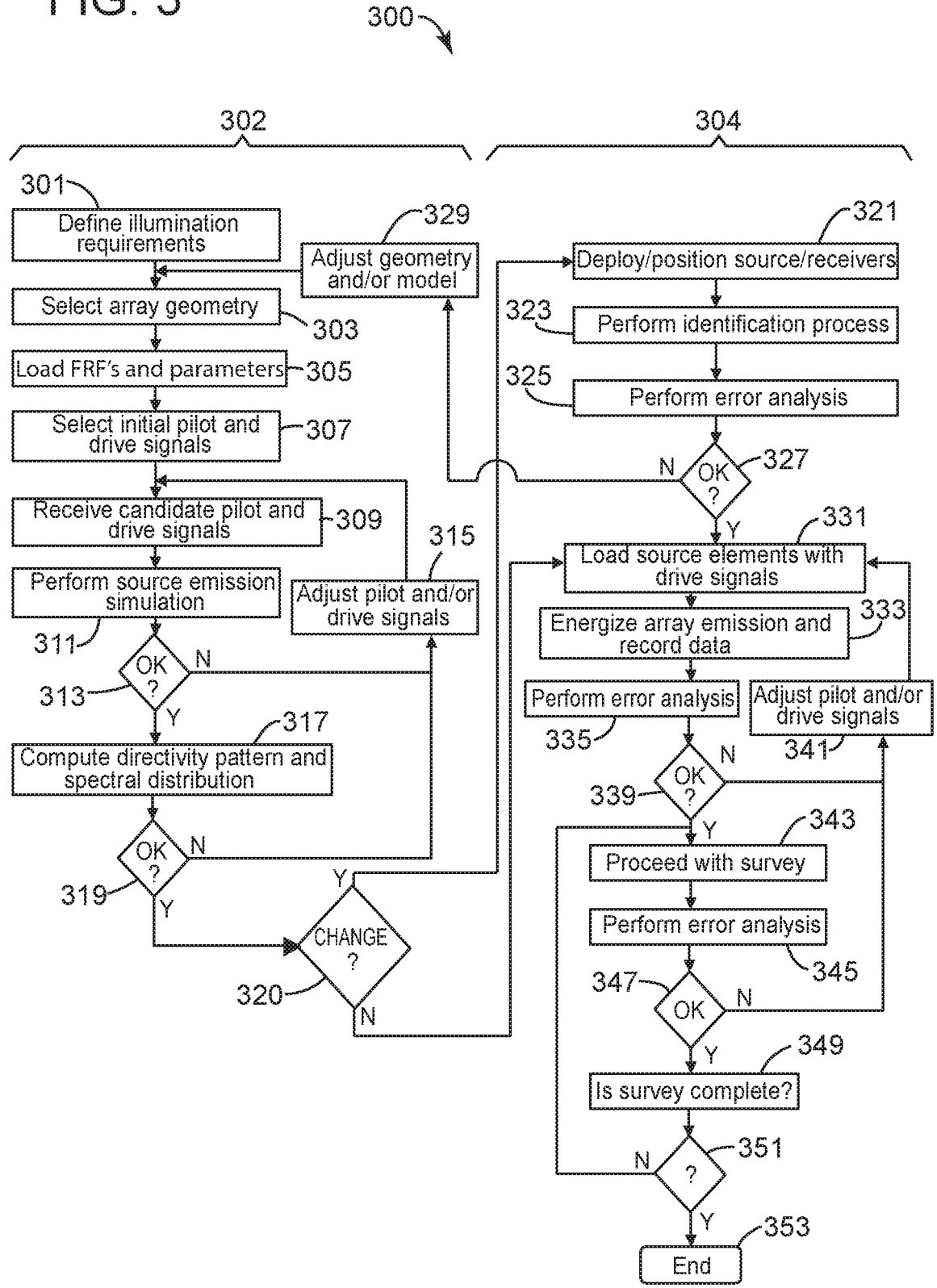
FIG. 3 is a flowchart of a method for adjusting the pilot and drive signals of a source array.

The process for adjusting the pilot and/or drive signals is now discussed with regard to FIG. 3. According to an embodiment, method 300 includes a first part 302 that is usually performed before the physical equipment is deployed in water and it is based upon a priori knowledge of the system's components, and a second part 304 that includes the steps taken during the calibration process to adjust the source array parameters, pilot and drive signals based upon in situ measurements. These processes are now discussed in more detail.

The method starts with step 301, in which the illumination requirements of the survey are defined or received. The illumination requirements depend on the specifications of the equipment to be deployed, the geophysical objectives for the survey to be conducted, and the survey constraints, for example, a time constraint due to schedule. The illumination parameters may include the desired source array directivity pattern, desired spectral energy distribution and other parameters. In step 303, the source array geometry is selected based on the selected directivity pattern, subject to the number of source elements available, acoustic loading effects, positioning options and other operational constraints. Some considerations in this regard are disclosed, for example, in U.S. Pat. No. 9,482,765, the entire content of which is incorporated herein by reference. This patent discloses a process for selecting a source array geometry based upon its operating constraints.

In the next two steps, inputs to a source array emission simulation program are provided and the source array emission simulation program estimates in step 311 the achievable output signal and/or spectral output of the source elements of the source array, subject to equipment constraints. The source array emission simulation program uses a model of the source array and the source array geometry to estimate the pilot and drive signals of the source array that would achieve the desired illumination requirements. However, these steps do not take into account any data measured while the source elements of the source array are deployed and active in water. In other words, the steps associated with the first part 302 do not need measured data.

More specifically, in step 305, the frequency response functions (FRFs) or (frequency transfer functions) characterizing the source array (to be discussed later in more detail) and other parameters are loaded into the computer program. The FRF may be calculated from prior surveys and/or prior measurements. Initial pilot and drive signals for each source element are selected in step 307 and these may be swept sine wave signals or pseudorandom signals or other types. In step 309, the candidate pilot and drive signals (which are the initial pilot and drive signals when the method advances from step 307 to 309, and candidate signals when the method advances from step 315 to 309) are received by the simulation routine, and calculations are performed in simulation step 311. These simulations estimate the source array's overall emission based entirely on a model of the source elements, the interactions between them, and the geometry of the source array. These steps are performed, for example, in the operator's land facility and require highly specialized software and hardware. In one application, the steps may be performed on the streamer vessel, before launching the seismic survey.

In step 313, the estimated source array elements' output signals (for example piston accelerations), actuator currents, actuator voltages, piston motions and so on (obtained during simulation step 311) are checked against known limitations of the equipment to ensure that the equipment operates within normal ranges. If the output of step 313 is in the affirmative, the method proceeds to step 317, where the piston acceleration model estimates are used as inputs to another computer program to compute the resultant radiation pattern (see, for example, U.S. Patent Application No. 2014/0204701 for details about the computer program that estimates the radiation pattern, the entire content of which is incorporated herein by reference) and spectral distribution.

If it is found in step 313 that there is a problem with the simulation result, for example, one or more equipment constraints have been violated, then the process advances to step 315 and adjusts the pilot and/or drive signals to bring the violated condition or constraint back into its normal operating range. For example, an adjustment might include reducing the amplitude of the pilot and/or drive signal over a range of frequencies to avoid having the piston hit its stops and/or to avoid exceeding the current rating of the actuator or for other reasons. If the amplitude had to be reduced, then there could be a corresponding increase in the dwell time over a range of frequencies to help compensate for the reduction in the temporal amplitude. This modification may also result in a reduction in the dwell time at other frequencies, where the vibrators were operating within rated specifications, for preserving the overall dwell time over the entire frequency range.

If the spectral distribution and/or directivity pattern computed in step 317 are determined to be acceptable in step 319, then the method advances to step 320. Otherwise, the method loops back to step 315 for further adjustment of the pilot and/or drive signals. In this case, if, for example, the total energy spectral density output of the source array was insufficient over a frequency range, then the pilot and drive signals would be adjusted. For example, it is possible that the overall frequency range of a sweep would need to be reduced so that the dwell time over the range of frequencies of concern could be increased. In a different case, it is possible that the directivity pattern is too directional or the angle of its maxima needs to change. If this is the case, then, in step 315, the phasing and/or amplitude of the drive signals would be modified. One possible way for modifying the drive and pilot signals will be described later in step 341.

In step 320, if this is the first time that process 300 has entered this decision step or if this is a re-entry because there has been a change in the deployed source array geometry (step 329), then the method advances to step 321. If the method is re-entering block 320 and the selected source array geometry in step 329 has not changed since the previous identification process was conducted, then the method advances to step 331.

At this point the method moves to the second part 304, in which in situ measured data is used for adjusting the pilot and/or drive signals. This part of the method assumes that the equipment (e.g., source array) has arrived at the survey location and that the source elements have been deployed in step 321 at their nominal operating array positions/depths, with receivers also in the water. A calibration process and identification step 323 may use the same mathematics as in step 305, but this time because the source elements are deployed in water, measured data is used, which results in different results. One difference between steps 305 and 323 is that instead of using only a priori information (as in step 305), step 323 uses empirical measurements made at the deployment site to estimate the FRF's. The means and method of making empirical measurements and estimation of FRF's constitutes the identification process 323. For example, random drive signals may be applied to the source elements and the sensors deployed at the source array measures the resulting data. In one application, coded signals are applied to drive the source elements. Irrespective of what signals are used as the drive signals, step 323 is configured to obtain individual data about each source element. In other words, one objective of this step is to measure data that characterizes not the entire source array, but each source element. This may be achieved, for example, by applying a driving signal only at a single source element for determining its response. This step may then be repeated for each source element of the source array.

By way of background, the identification process 323 is now discussed to explain how the actual relative positions of the source array elements and the resultant array element interaction effects can change the loading effects on the source elements and how these factors change the transfer function models used to simulate the array output.

Figure 4:
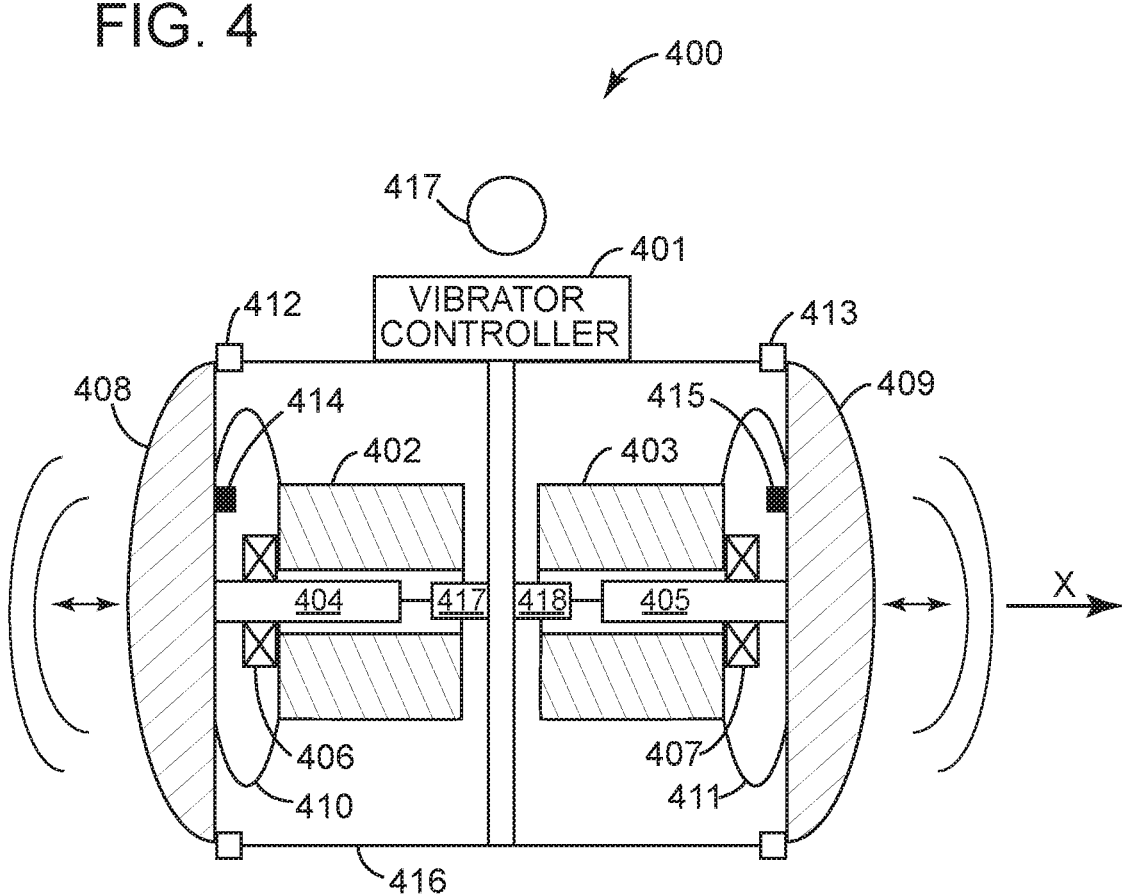
FIG. 4 illustrates a marine vibrator twin driver.

Before discussing step 323 in more detail, a marine vibrator configuration is introduced. Marine vibrators are typically less than a few meters in size to facilitate ease of deployment and retrieval. A source element or marine vibrator (these terms are used interchangeably in the following) is shown in FIG. 4. Source element 400 is a marine vibrator configured as a twin driver. The twin driver has two acoustic pistons 408 and 409 connected to corresponding moving shafts that include magnets 404 and 405. Magnets 404 and 405 interact with a magnetic field produced by electromagnetic windings 402 and 403 and move along axis X back and forth. Linear bearings 406 and 407 help maintain alignment of the driven structure, in conjunction with centering springs 410 and 411. Acoustic pistons 408 and 409 are connected to housing 416 via flexible seals 412 and 413 that allow axial motion of the acoustic pistons.

Sensors, for example, piston accelerometers 414 and 415, LVDTs 417 and 418 suitable for measuring the piston position in conjunction with other sensors (not shown), for example, enclosure accelerometer, current sensors, voltage sensors, thermal sensors, pressure sensors and so on can communicate with the vibrator local controller 401 to provide feedback control signals and/or monitoring information. In an embodiment, the vibrator local controller contains a small data acquisition system that receives the sensor information and makes it available to the array manager through communication links 205 and 206 via marine vibrator interface unit 203, as discussed with regard to FIG. 1.

In this example, the vibrator local controller 401 receives as input two drive signals, one for each acoustic piston. The drive signals are used by the local controller 401 in combination with feedback signals from the various sensors, to provide signals to drive servo-amplifiers. Each electromagnet coil 402 and 403 has its own servo-amplifier to drive it.

The marine vibrator may also be equipped with a pneumatic hydrostatic balance system, not shown, to overcome the force exerted on the piston due to operation depth. In an embodiment, the twin drive may be equipped with at least one receiver 417, for example, a hydrophone, for detection of the acoustic pressure signal near the marine vibrator (measured data). The output of receiver 417 may be in communication with the data acquisition system located within vibrator controller 401 and may be used to help monitor the vibrator and/or array acoustic output and/or to estimate array interaction forces impinging on acoustic pistons 408 and 409.

In another embodiment, acoustic pistons 408 and 409 are driven so that their motions mirror each other and thus, the two drive signals presented to the twin driver vibrator controller may be identical so that the reaction forces generated by the piston accelerations are balanced and the enclosure 416 remains relatively stationary.

Returning to step 323, conventional marine vibrators can be considered to behave like simple acoustic monopoles as they vibrate, i.e., a dynamic change in the volume of water displaced by a source element gives rise to a pressure wave. A small source element is one whose dimension measures less than one-third of the wavelength of sound in the medium. For water, the speed of sound is about 1500 m/s and thus, a source element emitting 50 Hz would need to have a size of less than 10 m. For small volumetric vibratory source elements working in a fluid, their acoustic output (acoustic pressure wave) is directly related to their effective volumetric acceleration. The volumetric acceleration generated by a piston, in contact with the fluid medium, vibrating axially within a closed end cylinder enclosure, generates a volumetric acceleration that is equal to the product of the piston projection area and the piston's linear acceleration relative to the enclosure.

The peak temporal output of an individual source array element (marine vibrator) is primarily governed by two factors: the maximum force of the actuator used to drive the acoustic piston and the total load the actuator force must vibrate. The maximum force the actuator can provide may be constrained by a number of factors. For example, for a linear electromechanical actuator, the constraints may include: stroke, peak velocity, peak current, maximum voltage and input power. These constraints may be due to the rating of the actuator itself or, for example, the power amplifier used to drive it. To achieve a desired total energy output whose spectral shape follows a desired shape, trade-offs between the dwell time and the temporal amplitude can be made.

For example, if the temporal output is limited over a range of frequencies, then one way to build up the energy over that range is to spend more time emitting energy over that range of frequencies. The downside to increasing the dwell time is that the overall time required to acquire data is increased, which will add cost to the survey. Thus, it is desirable to ensure that the source array operates efficiently during the survey.

Figure 5:
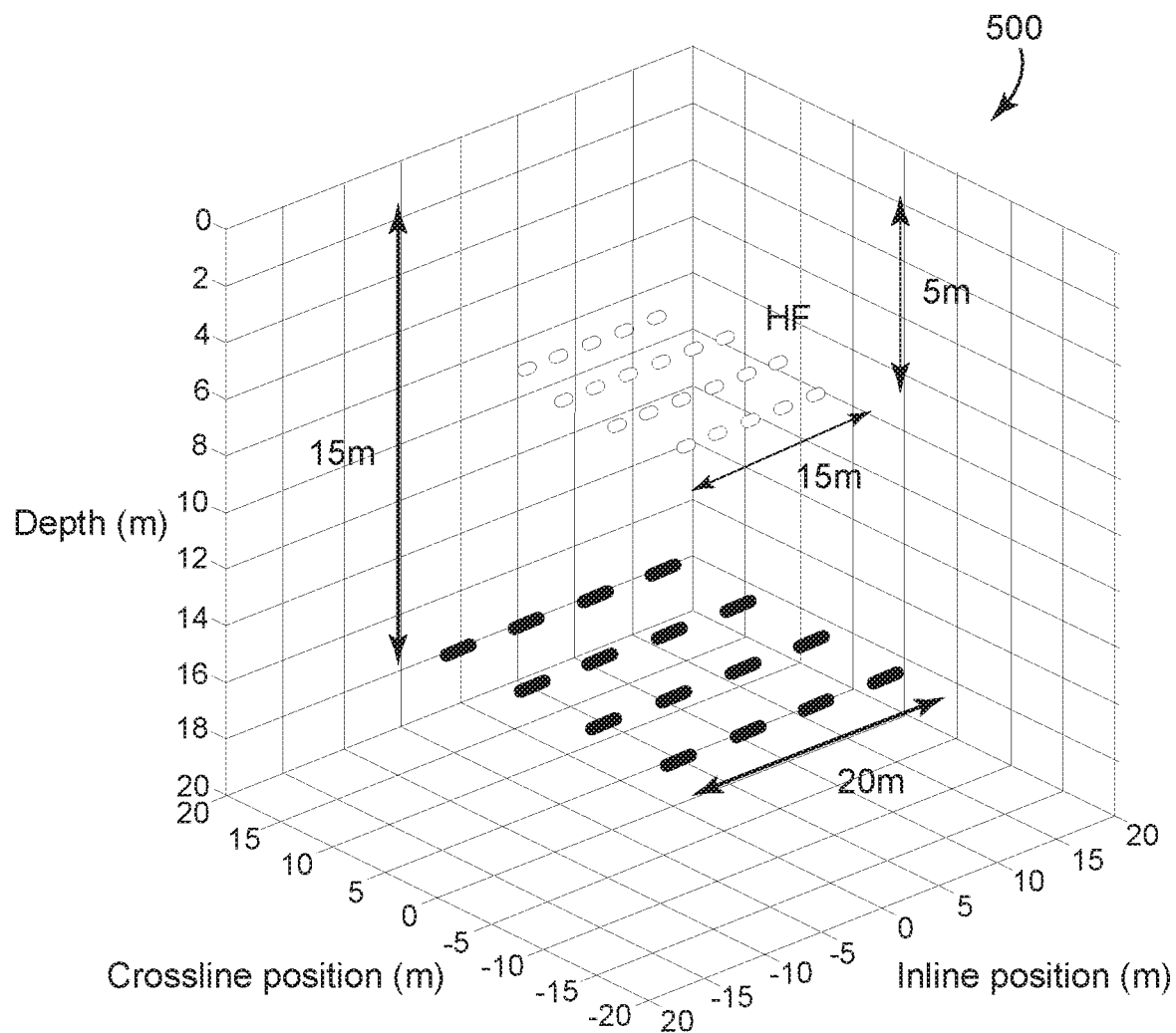
FIG. 5 illustrates a source array having a high-frequency plurality of source elements and a low-frequency plurality of source elements.

By way of illustrating the extent of loading effects within a source array, an over-under source is shown in FIG. 5. The source array 500 includes 16 LF (low frequency) twin-transducers and 22 HF (high-frequency) twin-transducers. In an embodiment, the LF useful frequency range is about 4-30 Hz and the HF useful frequency range is about 25-150 Hz. All the source elements per sub-source (HF or LF) are synchronized due to a source controller. Due to acoustic interactions between the source elements, each piston has to take into account an incompressible fluid layer that represents an additive water load upon the mechanical mass of the moving parts. These radiation masses can vary with frequency and their respective locations. It was observed that source elements located near the center of the LF sub-source have a radiation mass load of about 135 kg while the source elements at the outer corners have an effective load of about 80 kg.

Figure 6:
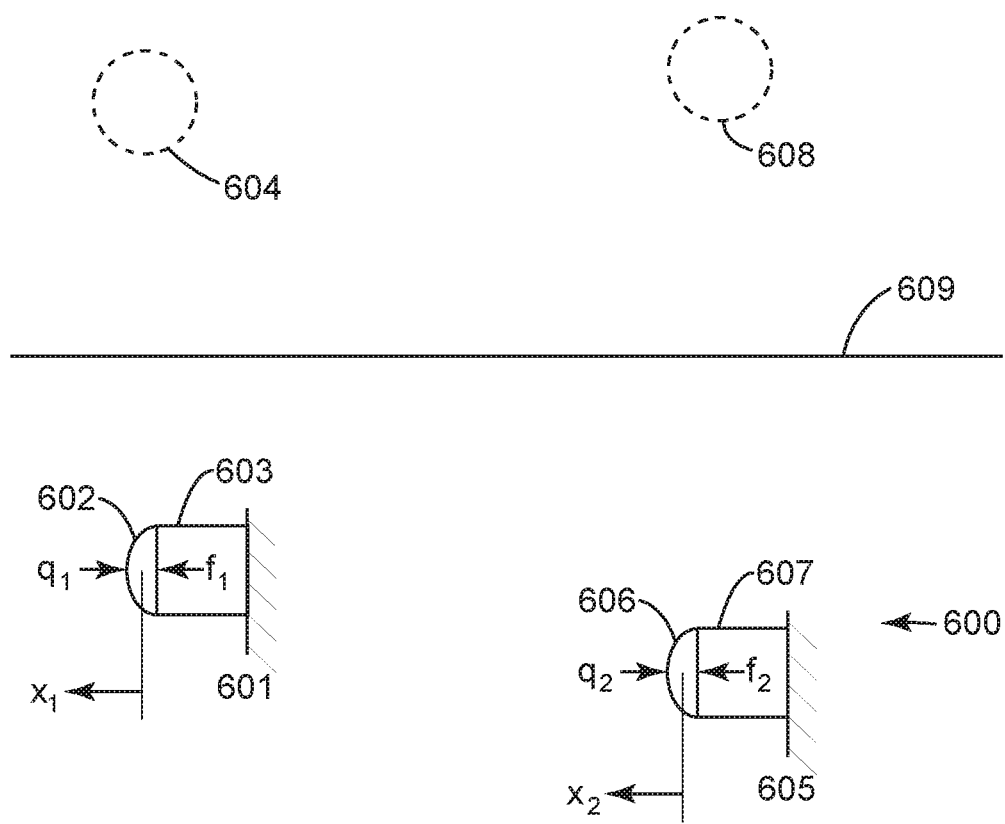
FIG. 6 illustrates a source array having two source elements.

An example is considered next to explain the loads acting upon the source elements of a marine vibrator array. FIG. 6 shows a two-element array 600 having two marine vibrators 601 and 605, deployed at a given depth below the sea surface 609. Each marine vibrator is equipped with an acoustic piston 602 and 606, respectively, that in this case vibrates horizontally. For simplicity, it is assumed that the marine vibrator enclosures 603 and 607 are stationary and that only their pistons move. Pistons 602 and 606 vibrate when they are driven by actuator forces $f_1$ and $f_2$ respectively. The instantaneous displacement of each piston relative to their center position is denoted by $x_1$ and $x_2$. In order to accelerate pistons 602 and 606, forces $f_1$ and $f_2$ need to accelerate the structural driven masses $m_1$ and $m_2$ of pistons 602 and 606, respectively and at the same time to overcome the resisting forces $q_1$ and $q_2$. Resisting forces $q_1$ and $q_2$ represent respectively a superposition of various external forces acting upon pistons 602 and 606 that can be broken down as follows:

$$q_1 = w_{1,1} + g_{1,1} + w_{1,2} + g_{1,2}, \text{ and} \tag{1}$$

$$q_2 = w_{2,2} + g_{2,2} + w_{2,1} + g_{2,1} \tag{2}.$$

where:
- $w_{1,1}$ is the force exerted by the water upon the piston face 602 due to the direct action of piston 602's acceleration,
- $g_{1,1}$ is the force exerted upon the piston face 602 due to the pressure wave reflected back from water surface 609 due to piston 602's acceleration,
- $w_{1,2}$ is the force exerted by the water upon piston face 602 due to the direct arrival of the pressure wave created by piston 606's acceleration,
- $g_{1,2}$ is the force exerted upon the piston face 602 due to the pressure wave reflected back from water surface 609 due to piston 606's acceleration, $w_{2,2}$ is the force exerted by the water upon the piston face 606 due to the direct action of piston 606's acceleration, $g_{2,2}$ is the force exerted upon the piston face 606 due to the pressure wave reflected back from water surface 609 due to piston 606's acceleration, $w_{2,1}$ is the force exerted by the water upon piston face 606 due to the direct arrival of the pressure wave created by piston 602's acceleration, and $g_{2,1}$ is the force exerted upon the piston 606 face due to the pressure wave reflected back from water surface 609 due to piston 602's acceleration.

The force terms $w_{1,1}$ and $w_{2,2}$ can be thought to representing the force due to self-radiation impedance loading effect while all the other forces $w_{1,2}$, $w_{2,1}$, $g_{1,1}$, $g_{1,2}$, $g_{2,2}$ and $g_{2,1}$ represent mutual impedance loading effects due to the other source elements or a reflection. Virtual sources (often called notional sources in marine applications) 604 and 608 are positioned vertically above sources 601 and 605, respectively, at a height above sea surface 609 corresponding respectively to the depths of sources 601 and 605. The virtual sources provide an easy way to represent the distance traversed by a surface reflection and are useful in computing the geometric spreading loss and time delay of the associated p-wave reflection. In this case, virtual source 604 represents the surface ghost p-wave from source 601 and virtual source 608 represents the surface ghost p-wave from source 605.

The sound intensity assumed for virtual sources 604 and 608 is taken to be the same as that of the corresponding primary sources 601 and 605, but multiplied by the reflection coefficient of the sea/air interface, which typically is close to −1 in value for calm water. In theory, the forces associated with mutual impedance loading effects ($w_{1,2}$, $w_{2,1}$, $g_{1,1}$, $g_{1,2}$, $g_{2,2}$ and $g_{2,1}$) are just the product of the projection area of the piston of interest and the time delayed pressure wave due to the other primary source elements or virtual source elements reduced by their geometric spreading loss. In practice, the sources may not be located exactly at their "theoretical" assumed positions as the sea state may vary and nearby surface vessels, debris or air in the seawater may affect the surface reflection coefficient. For these additional reasons, step 323 is different from step 305.

The accelerations of pistons 602 and 606 are represented by $a_1$ and $a_2$, which are the second derivatives with respect to time of displacements $x_1$ and $x_2$. These accelerations are described in this model by equations (3) and (4):

$$m_1 a_1 = (f_1 - w_{1,1} - g_{1,1}) - (w_{1,2} + g_{1,2}), \text{ and} \quad (3)$$

$$m_2 a_2 = (f_2 - w_{2,2} - g_{2,2}) - (w_{2,1} + g_{2,1}). \quad (4)$$

Note that terms $w_{1,1}$ and $g_{1,1}$ are solely due to the action of $f_1$; $w_{2,2}$ and $g_{2,2}$ are due to the action of $f_2$; $w_{1,2}$ and $g_{1,2}$ are due to the action of $f_2$; and, $w_{2,1}$ and $g_{2,1}$ are due to the action of $f_1$. In an embodiment, a hydrophone located near each source element, for example, by the first source element 601, could be used to measure the pressure signal resulting from another source element, for example second vibrator 605. Knowing the piston area of the affected piston (first piston), it is possible to estimate the sum of the interfering forces $w_{1,2}$ and $g_{1,2}$. In addition, in another embodiment, a transfer function relating, in this example, $f_2$ and the sum $w_{1,2}$ and $g_{1,2}$ could be estimated. If an electric linear motor is used as an actuator to drive the piston, then forces $f_1$ and $f_2$ can be determined by measuring the actuator's current and forming the product of the current and BL or force factor (N/A), where B is the magnetic field and L is the length of a wire that moves in the magnetic field.

Equations (3) and (4) can be rewritten in the frequency domain using a two input two output transfer function matrix $H(I\omega)^{A/F}$ or just $H^{A/F}$, where the term "$\iota$" is the complex number $(-1)^{1/2}$ and $\omega$ is the frequency (radians/s). The superscript$^{A/F}$ indicates that the force F is the input and the output is the acceleration A. The Fourier transform of the two inputs $f_1$ and $f_2$ are represented by $F_1$ and $F_2$, and the two outputs $a_1$ and $a_2$ have Fourier transform representation $A_1$ and $A_2$. Thus, $$A = [H^{A/F}]F \quad (5)$$

where:

$$A = (A_1, A_2)^T, \quad (6)$$

$$F = (F_1, F_2)^T, \text{ and} \quad (7)$$

$$H^{A/F} = \begin{bmatrix} H_{1,1}^{A/F} & H_{1,2}^{A/F} \\ H_{2,1}^{A/F} & H_{2,2}^{A/F} \end{bmatrix}. \quad (8)$$

One method for estimating the elements of $H^{A/F}$ includes acquiring data with the sensors noted above (measured data), where the data results from the application of special orthogonal/uncorrelated force signals to the source elements, and measuring the resultant piston accelerations. Because the output transfer function $H^{A/F}$ is to be estimated at discrete frequencies $\omega_\nu$ of interest, the argument $\nu$ is now understood to represent a discrete frequency index.

One way of estimating the transfer function is now discussed. For this example, it is possible to form a 2 by 2 cross-spectral density matrix $R_{FF}$ based on the measured forces. For each discrete frequency, the elements of $R_{FF}$ are the corresponding Fourier transform coefficients of the frequency domain representation of the auto and cross-correlation between the applied forces. Similarly, a cross-spectral density vector $R_{AF}$ is formed based on the FFT coefficients, in the frequency domain, of the transformed cross-correlation between the measured piston accelerations and forces. In the more general case, where the source array includes $N_s$ source elements (marine vibrators), the number of rows in vector F would increase to $N_s$ and the dimension of matrix $H^{A/F}$ becomes $N_s$ times $N_s$.

In one application, the cross-correlations between the various measured signals may be windowed to reduce the noise before the Fourier transformation is applied. The Fourier transform may take the form of an FFT, in which case the frequencies are discrete and the ordinary least squares solution shown in equation (9) would be made at each frequency. In another embodiment, a weighted least squares solution could be used, where the weighting function is a function of spectral coherency. In equation (9), the term $\epsilon_1 I$ has been added to stabilize the matrix inversion process where I is the unity matrix and $\epsilon_1$ is a small number, for example, 1% of the mean variance of the actuator force. The symbol $H^-$ denotes the estimate of H and thus this estimate is given by:

$$H^{-A/F} = R_{AF}(R_{FF} + \epsilon_1 I)^{-1} \quad (9)$$

In practice, the applied actuator force can be considered a convolution of the marine vibrator drive signal and a filter/transfer function that describes the electromechanical system used to drive the acoustic piston. For example, the electromechanical system may include servomotor amplifiers that convert the drive signal voltage into a current, a linear motor that converts the current into an actuator force and so on. Thus, other matrix transfer functions, for example, $H^{A/I}$, $H^{A/U}$ etc., that relate output piston accelerations to respectively input actuator current (I) or input actuator voltage (U) can be estimated using the internal sensor measurements (current, and voltage sensors and so on).

In another embodiment, the drive signal for the marine vibrator electromechanical system can be used instead of the actuator forces $f_1$ and $f_2$ and the matrix transfer function $H^{A/F}$ could be replaced by the matrix transfer function FRF (Frequency Response Function) $H^{A/D}$, which relates the input drive signals $d_1$ and $d_2$ to the piston accelerations $a_1$ and $a_2$.

The identification process of step 323 can be extended to include more than just two vibrator elements in the source array and the dimension of the matrices would grow proportionately. If the frequency domain transformed drive signals are used instead of the actuator force signals, equation (5) becomes equation (10), where vector D represents the set of applied drive signals after transformation to the frequency domain:

$$A=[H^{A/D}]D. \tag{10}$$

Because of the marine vibrator system operation's limits with regard to actuator current, voltage, piston stroke, peak piston velocity, real power consumed, amplifier reactive power output and so on, sensor information recorded during the source array identification process (measured data) can be used to estimate FRFs relating the marine vibrator actuator currents (I), voltage (U), piston axial velocity (V), and piston axial displacement (X) to the output piston acceleration. For example, FRF $H^{A/I}$ relates the actuator current I to the output acceleration A or FRF $H^{A/U}$ relates the actuator voltage to the output acceleration and so on.

Depending upon the nature of the measurement noise in the sensor signals and noise level, different methods may be used to estimate an FRF as an alternative to a simple least squares solution, for example, a weighted least squares method. FRF estimation methods based upon error minimization of the L1 norm can also be used, but are usually more computationally expensive. In some situations, where high noise levels are present, various noise mitigation techniques may be helpful. For example, repeated measurement with median filtering, noise spike suppression and so on may be performed prior to FRF estimation. In some circumstances, techniques like SVD (singular value decomposition) may be used to resolve problems if the signal levels are low for some frequencies.

Note that each function, and therefore, each resulting FRF matrix is a function of frequency. To obtain the most accurate estimates in step 323, it is preferred that the drive signals used as inputs to the source elements (e.g., transducers) for the identification process be independent, or at least be separable in the sense that the individual contribution of each marine vibrator can be determined. Input drive signals such as phase-encoded chirp sequences, or scheduled discrete or narrow band frequency emissions can be used. These drive signals are designed so that no two vibrator elements emit the same frequencies at the same time. The drive signals may also be random, or random transient or periodic random, also called pseudo-random, if the projectors are to be identified simultaneously. Note that if only one projector (source element) is to be identified at a time, then the same identification signal could be used for each source element. However, this scheme of identification is time-consuming. The identification signals can be band-limited according to a frequency range of interest.

In an embodiment, it may be desirable to construct inverse operators, for example, $H^{I/A}$, to estimate the expected input current required to achieve a given piston acceleration signal as shown in equation (11):

$$H^{I/A}=[H^{A/I}]^{-1}. \tag{11}$$

In addition to using the measured data for estimating the various FRFs (step 323 in FIG. 3) for the various source array elements, the measured data can also be used to estimate other useful parameters, for example, the speed of sound in the water, the sea surface reflection coefficient, etc. Because the location of each source element is measured using GPS in conjunction with underwater locating system 221 (for example, a source location detection system similar to the Sercel Nautilus system in current use for underwater location of streamers), by measuring the travel time of the p-wave signals between marine vibrators during the identification process, the speed of sound can be measured. The surface reflection coefficient can also be estimated by comparing the amplitude of primary and surface reflection signals relative to one another after correction for spreading losses.

Continuing with the identification process 323, a marine vibrator source array's output, when operating in a free field, can be modeled as a superposition of the individual acoustic contributions of the individual source array elements. In a free-field environment, the pressure wave signal from an acoustic monopole is the product of a spreading loss term (reciprocal of the distance between the monopole and receiver) and the product of the radiating surface area and the volumetric acceleration of the monopole surface, which is time delayed by the propagation time (speed of sound in water "c" divided by distance between monopole and receiver). When the marine vibrators are deployed at given depths, then the water/air interface creates a surface reflection. In that case, the individual acoustic contributions contain primarily a combination of a primary arrival (free-field contribution) with a surface reflection (ghost) arrival. In some cases, multiple reflections from an individual source element may be present, for example, due to seabed reflections, which in turn may also lead to additional surface reflection events and so on.

Equation (12), discussed below, shows this relationship in the frequency domain, for the far-field pressure signal $P_{i,j,v}$ measured at the $j^{th}$ receiver due to the action of the $i^{th}$ marine vibrator with a discrete frequency $\omega_v$ (radians/s), where v is the frequency index, $$P_{i,j,v} = \left[\frac{A_i(i\omega_v)S_i\rho}{(4\pi)}\right]\left[\frac{e^{-\frac{i\omega_v r_1(i,j)}{c}}}{r_1(i,j)} + \frac{R_i e^{-\frac{i\omega_v r_2(i,j)}{c}}}{r_2(i,j)}\right]. \tag{12}$$

If equation (12) is to be evaluated at near-field discrete frequencies $\omega_v$, then the frequency index v is given by 1, 2, . . . , $N_f$. Other terms in equation (12) include the complex number t defined above, $\rho$, which is the seawater density (about 1020 kg/m$^3$), $S_i$ the surface projection area (m$^2$) of the marine vibrator's moving piston, and $A_i$ the axial piston acceleration (m/s$^2$). If the number of real source array elements is $N_s$, then i=1, 2, . . . , $N_s$. The term $r_1(i,j)$ is the distance between the $i^{th}$ marine vibrator and the $j^{th}$ receiver and term $r_2(i,j)$ is the distance between the $i^{th}$ virtual source element (604 or 608) representing the ghost effect (located above sea surface) to the $j^{th}$ receiver. The term $R_i$ in this case is the reflection coefficient for the water surface above the $i^{th}$ marine vibrator and is typically about −1.

In another embodiment, during the identification process 323, it is possible to measure the FRFs between each source element and various selected receivers, taking as an input each marine vibrator piston's acceleration and taking as an output the measured pressure signal for each receiver. The resulting FRFs could be represented in a matrix transfer function called $H^{P/A}$.

Convolving $H^{P/A}$ with $H^{A/D}$ to yield $H^{P/D}$ can also be computed to estimate the effect of the various drive signals upon the various receiver signals. In some cases, it may be useful to work in terms of the inverse operator HD/P and/or $H^{P/A}$ to work backwards from a desired received pressure signal to determine the drive signal required to achieve the desired result.

In still another embodiment, the reflection coefficients and/or other parameters for each source element could be estimated by performing a least squares fit of equation (12) using the measured pressure and acceleration signals over a selected frequency range, as a way to update the array model. By estimating and updating the parameters in equation (12), a useful model of the source array is obtained, which enables one to estimate the signal contribution from the combined primary and surface reflection arrivals of a particular marine vibrator for arbitrary observer points (underwater receiver positions), once the piston acceleration has been defined. By summing the contributions for each source array element (marine vibrator) at a fixed distance from the source array's center, over a wide range of angles, it is possible to estimate the resultant directivity pattern as will be explained next, based on equation (12), but with local reflection coefficients and/or other parameters whose valued have been estimated using the measured data.

Having described the identification process 323, next the method performs an error analysis in step 325. The error analysis may compare the empirically derived FRF's with the parameters used in step 305 to determine if the equipment is operating correctly. Another outcome of the error analysis step 325 may be that the geometry of the deployed source array does not match the anticipated source array geometry. If the result of the error analysis of step 325 (i.e., comparison of the expected parameters and the estimated parameters calculated based on specification data, the model of the source array and the measured data) is determined to be favorable in step 327, then the process advances to step 331. If there is an unfavorable outcome in step 327, and the calculated parameters deviate too much from the anticipated model, then the calibration process is looped back to step 329 for selecting another geometry of the source array and/or for adjusting the model used in step 305. In this case, all the steps discussed above are repeated until a positive determination in made in step 327. Note that a difference between steps 305 and 323 is that step 323 uses measured data while step 305 relies on numerical simulations and modelling.

Having shown how the frequency response of the individual marine vibrators is calculated using measured signals (step 323), it is now discussed how the combined output of the source array elements can be modeled and measured (overall response of the source array). In step 331, the marine vibrator controllers are loaded with their drive signals that are to be used in the survey (for example, from step 307). Assuming that the receivers 209, for example hydrophones, have been deployed in step 321, in this example, the radiated pressure signals (generated by the source array elements) are recorded in step 333. Note that the receivers may be located on the source array, next to the source array or on the streamers. In step 335, error analysis similar to that performed in step 325 may be repeated. The difference between step 335 and step 325 is that the analysis in step 335 is performed with actual pilot and drive signals with the intent of measuring the collective output of the source array while the analysis in step 325 was performed with marine vibrators excited by independent signals, for example, pseudorandom signals, useful for characterizing the output of each array element. While it is desirable that the excitation signals be independent, this is not a necessary condition to perform the estimation. As long as there is a way to distinguish/separate the individual contributions of each marine vibrator in the first measurement, any excitation signal can be used. For example, the excitation signals may be weakly correlated or orthogonal.

Also note that step 333 is different from step 323 because in step 333 the overall response of the source array has been calculated based on the measured data while in step 323 the individual responses of the source elements of the source array have been calculated.

In step 339, the overall response of the source array are compared against the previously defined/desired directivity and/or energy spectrum target values. Typically, the comparison is performed in the frequency domain through computation of the energy spectral densities (ESDs) of the received signals against the model prediction for a receiver located in the same position. If the result of the comparison in step 339 is acceptable and the ESD levels are acceptable, the method advances to step 343 and the survey commences. If the result of the comparison in step 339 is unacceptable, then the method loops back to step 341 to adjust the pilot and/or drive signals to correct for any mismatch between the acceptable and measured directivity and/or energy spectrum.

Figure 7:
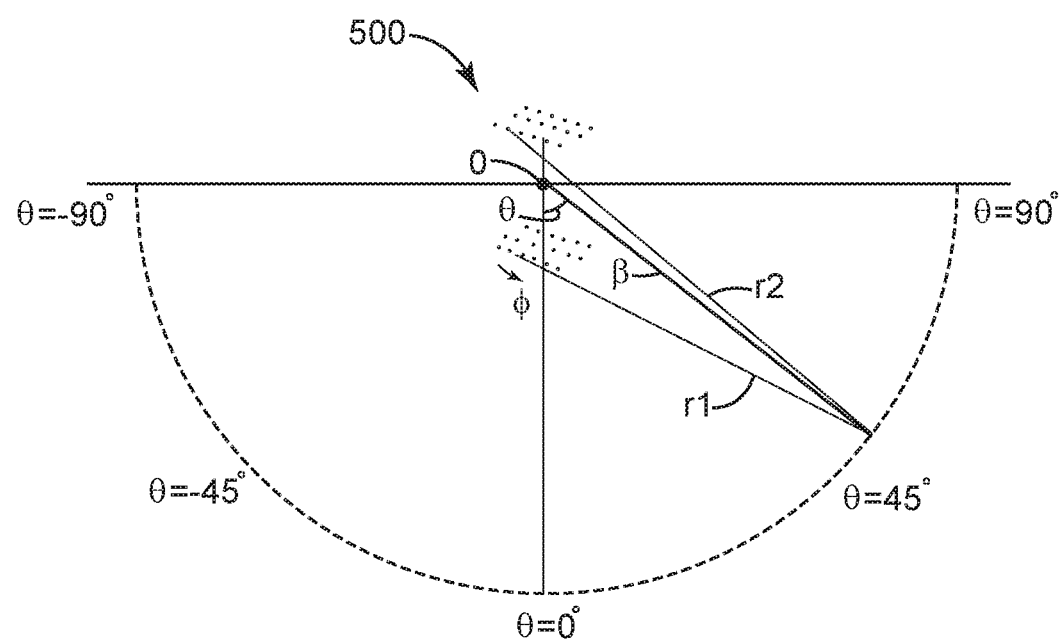
FIG. 7 illustrates geometrical parameters associated with a far-field estimate of a source array.

The adjustment of the pilot and/or drive signals in step 341 is now discussed. FIG. 7 illustrates the response of the source array 500 at a certain distance "β" from the center O of the source array, where θ represents the elevation angle, and φ represents the azimuth angle. Assume that the directivity pattern is to be evaluated over a discrete range of angles, for example: $(\theta_m, \varphi_k)$, where m=1, 2, ..., $N_m$ and k=1, 2, ..., $N_k$, with m being the elevation angle index and $N_m$ being the number of discrete elevation angles, and with k being the azimuth angle index and $N_k$ being the number of discrete azimuth angles. Equation (13) is a rewritten version of equation (12) that is normalized by the piston acceleration.

$$p_{i(k+N_m(m-1)),v} = \left[\frac{S_i \rho}{(4\pi)}\right]\left[\frac{e^{-i\omega_v r_1(i,k,m)/c}}{r_1(i,k,m)} + \frac{R_i e^{-i\omega_v r_2(i,k,m)/c}}{r_2(i,k,m)}\right], \quad (13)$$

where "p" is the normalized value of the far-field pressure signal "P."

To accommodate this evaluation at the selected distance between the $i^{th}$ source element and its ghost and the new observation point with angle indices k and m, index "j" is reintroduced to refer to the new $j^{th}$ observation point for which the contribution of the $i^{th}$ element is to be estimated. This means that this observation will have index j=k+$N_m$(m−1) so that equation (13) can be rewritten as equation (14).

$$p_{i,j,v} = \left[\frac{S_i \rho}{(4\pi)}\right]\left[\frac{e^{-i\omega_v r_1(i,j)/c}}{r_1(i,j)} + \frac{R_i e^{-i\omega_v r_2(i,j)/c}}{r_2(i,j)}\right]. \quad (14)$$

To convert equation (14) to a pressure contribution P, it is possible to convolve the response in equation (14) with the acceleration spectrum, as shown in equation (15), which is equivalent to equation (12), $$P_{i,j,v} = A_i(i\omega_v) p_{i,j,v} \quad (15)$$

Assume that there is a target T representing the normalized output of the source array as might be measured for a particular observation point located at a distance β from the source array center, at a selected angular position and selected discrete frequencies $\omega_v$, represented by $T_{j,v}$. Assuming that the vibrator elements' controllers work perfectly, then the $i^{th}$ piston's acceleration perfectly tracks its drive signal $d_i$. At this point, it is desired to compute the new drive filters 218 ($G_1, G_2 \ldots G_{N_S}$) so that when these filters are convolved with the pilot signal, the resultant emission directivity pattern shape will approximate the target T.

An objective function $J_v$ is introduced for calculating the new drive filters. The objective function is to be evaluated at $N_f$ discrete frequencies $\omega_v$, using the frequency index v=1, 2, . . . , $N_f$. In an embodiment, the selected discrete frequencies may be the same as, or a subset of, those used in an FFT.

In an embodiment, a weighted least squared error objective function J is given by:

$$J_v = \Sigma_{j=1 \ldots N_k N_m} W_j \cdot \| T_{j,v} - \Sigma_{i=1 \ldots N_S} G_{i,v} p_{i,j,v} \|^2 + L(G_{1,v}, G_{2,v}, \ldots G_{N_S,v}), \quad (16)$$

where $G_{i,v}$, which is the array containing all vibrator elements drive filters for frequency $\omega_v$, is computed for each frequency to achieve an overall minimization of the objective function J for the selected angular directions. Because the minimization is performed in the frequency domain, the elements of G will be complex numbers representing an amplitude and phase response for the filter's frequency domain transfer function.

Referring to equation (16), a directional weighting vector W is used to allow the user to emphasize angular directions that are more important. For example, in an embodiment, it may be desirable to consider the downward propagating energy, e.g., energy that falls within a cone defined by $0° \leq \theta \leq 30°$ and $0° \leq \varphi \leq 360°$. For this case, the values $W_j$ of the weighting vector W would be greater when the index j corresponds to a direction that falls within the aforementioned angular cone and the weightings ascribed to directions outside the cone would be smaller.

Equation (16) only shows vector W as a function of direction. However, in another embodiment, the applied weightings could be a function of both frequency and direction. For example, at low frequency, the directional weighting could be uniform and at higher frequency, the weighting could be greater for directions that fall inside the aforementioned cone. Those skilled in the art would understand that other choices are possible. By weighting certain directions more heavily, the algorithm will select drive filters that will tend to reduce the error between the target and estimated response (e.g., directivity) in the preferred direction, while at the same be less sensitive of larger errors in other directions.

In an embodiment, the function L in equation (16) is a penalty function for constraining the magnitude of the drive filter gains. For example, if it is desirable to hold the magnitude of G to a range of about $0.7 \leq G_{i,v} \leq 1$ with a nominal value of 0.85 ($a_3$=0.85), then the penalty function L shown in equation (17)

$$L(G_{1,v}, G_{2,v}, \ldots G_{N_S,v}) = K_a \Sigma_{i=1 \ldots N_S} [\| G_{i,v}/a_3 \| - 1]^\alpha \quad (17)$$

can be used, where a is selected to set how quickly the function increases as G approaches its outer range values, for example, α=6 could be used and a value of Ka=400. This means that when x (if the function is plotted versus variable x) is close to 0.85, the value of the constraint function is very small and when x exceeds the constrained range, the constraint function increases rapidly. Other penalty functions can be used based upon equipment constraints, operating conditions, etc. In another embodiment, no penalty function is used, but the solution parameter space is limited. The weighting term Ka sets the relative importance of the penalty function relative to the error function in combination with constraining the range of G coefficients.

The values of G that minimize cost function J as described in equation (16) can be numerically solved at each frequency of interest. Algorithms to perform the minimization include, but are not limited to, conjugate gradient, quasi-Newton, Monte Carlo schemes or other suitable algorithms. An example that uses a conjugate gradient minimization to obtain the solution is now discussed.

An example to illustrate the effect of adjusting the drive filters to mitigate the effect of positioning errors and disparities between assumed and measured surface reflection coefficients is now described. Assume that there are just six marine vibrators that form an inline array and in the initial modeling of the array design includes the following source positions (XT, ZT), where XT denotes the target inline position relative to the center of the source array and ZT represents the target depth of the source array. The target source element positions are: {(−50, 15), (−30, 20), (−10, 17), (10, 17), (30, 20), (50, 15)}, the assumed surface reflection coefficient is −1 for all source elements ($R_i$=−1) with the drive filter response zero phase spectrally flat and a 0.85 gain for all elements $G_{1,n}$=0.85. When the source elements are located in the field, using measured data, the source element positions (X, Z) were actually: {(−49, 16), (−33, 19), (−12, 17), (10, 18), (30, 21), (54, 14)} and the corresponding surface reflection coefficients were estimated to be: {−0.9, −0.95, −0.92, −0.95, −1, −0.95}. The problem is to calculate values for the drive filters (and implicitly the drive signals) so that the directivity pattern of the source array after the drive signals are adjusted will better match the target directivity at least over a certain range of angles.

Figure 8:
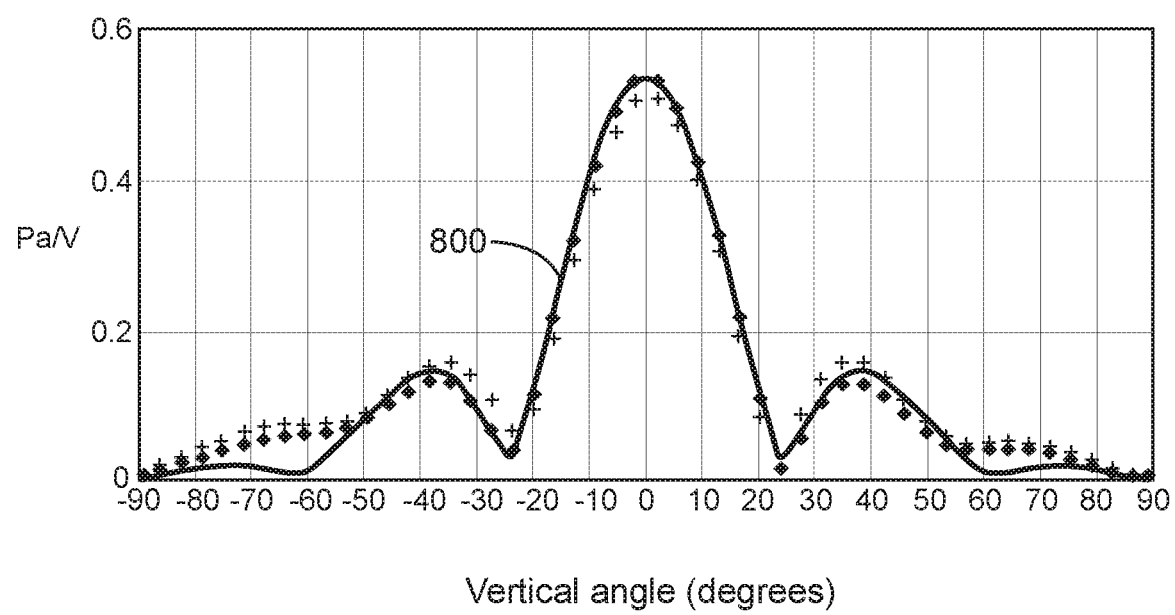
FIG. 8 illustrates the source array directivity for a given frequency.

In this example, the directional weighting coefficients corresponding to vertical angles in the range of $0° \leq \theta \leq 30°$ and $\varphi=0°$ used a weighting factor of 20 and for vertical angles outside this range the weighting factor was 1. The discrete angles covered the range of +/−90 degrees in 50 evenly spaced steps. The objective function J was minimized over the frequency range of 5 to 30 Hz in 0.5 Hz increments. FIG. 8 shows the result of such minimization for 29.5 Hz. The vertical axis has units of Pa/V and is the estimated sound pressure at 1,000 m from the source array center per unit of drive signal input (volts), assuming that the vibrator controller has a unit gain of 1 m/s²–V. Line 800 represents the target directivity response at 1,000 m. The target directivity is the theoretical response if all the vibrator elements occupied their correct positions and had drive filters that were simply gain blocks having a gain of 0.85 and the surface reflection coefficient is −1. The "+" symbol denotes the estimated array directivity if the drive filters were set to 0.85, with the vibrator elements located at their measured locations and the measured surface reflection coefficients are used. The "●" symbol in FIG. 8 shows the estimated response after the drive filters are adjusted to minimize J at 29.5 Hz. FIG. 8 shows the angular range with the higher weighting matches the target directivity better than for angles outside that range.

Figure 9A:
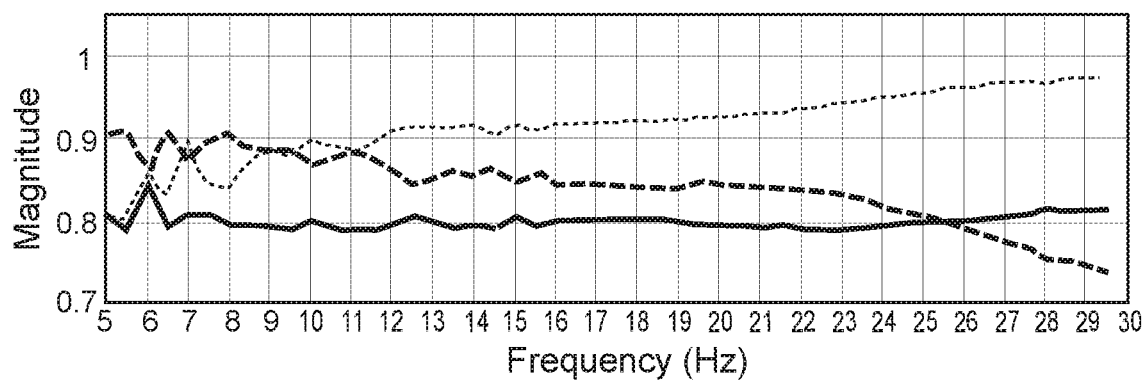
FIG. 9A illustrates the magnitude of drive filters versus frequency and FIG. 9B illustrates the phase of the drive filter versus frequency.
Figure 9B:
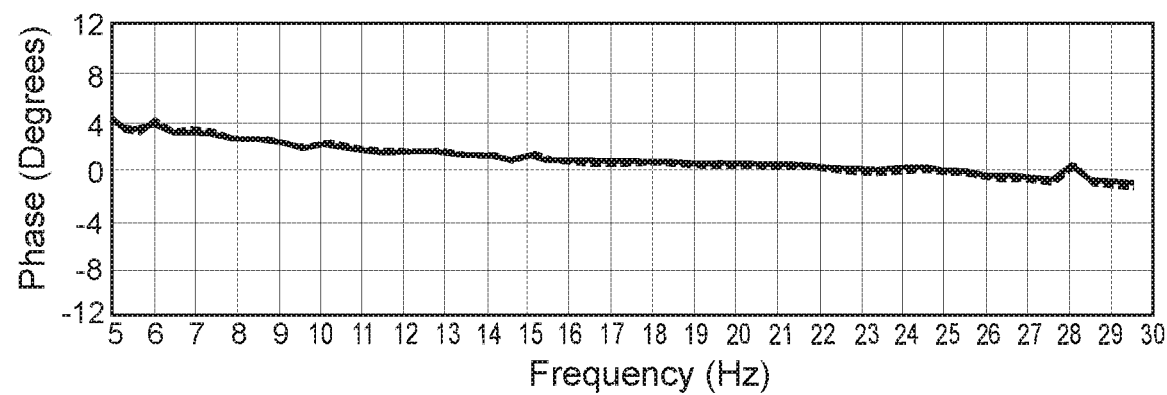

FIGS. 9A-9B show three of the six drive filter frequency responses, with FIG. 9A showing the amplitude responses and FIG. 9B showing the corresponding phase responses. Because the filter coefficients were only computed at a representative set of frequencies, if finer frequency sampling is necessary, the values can be interpolated to reduce the computational load. In one application, it may be undesirable to have coefficient values that change quickly. Thus, a smoothing filter may be applied to the calculated drive filter responses to reduce the rate of change in drive filter response.

Adjusting the drive filter changes how the source array emission is directed, but the actual spectral energy emitted at a particular frequency is determined by both the temporal amplitude and frequency dwell time of the drive signals, which is in turn set by the pilot signal. Without loss of generality, it is assumed for simplicity that the vibrator element controller has a zero phase response and behaves like a simple gain block with transduction gain Kc (m/s²–V). Under this assumption, the vibrator element piston's acceleration will be directly proportional to the drive signal with a scaling factor Kc. Note that the drive signal is just the result of convolving the pilot signal with the drive filter.

Figure 10:
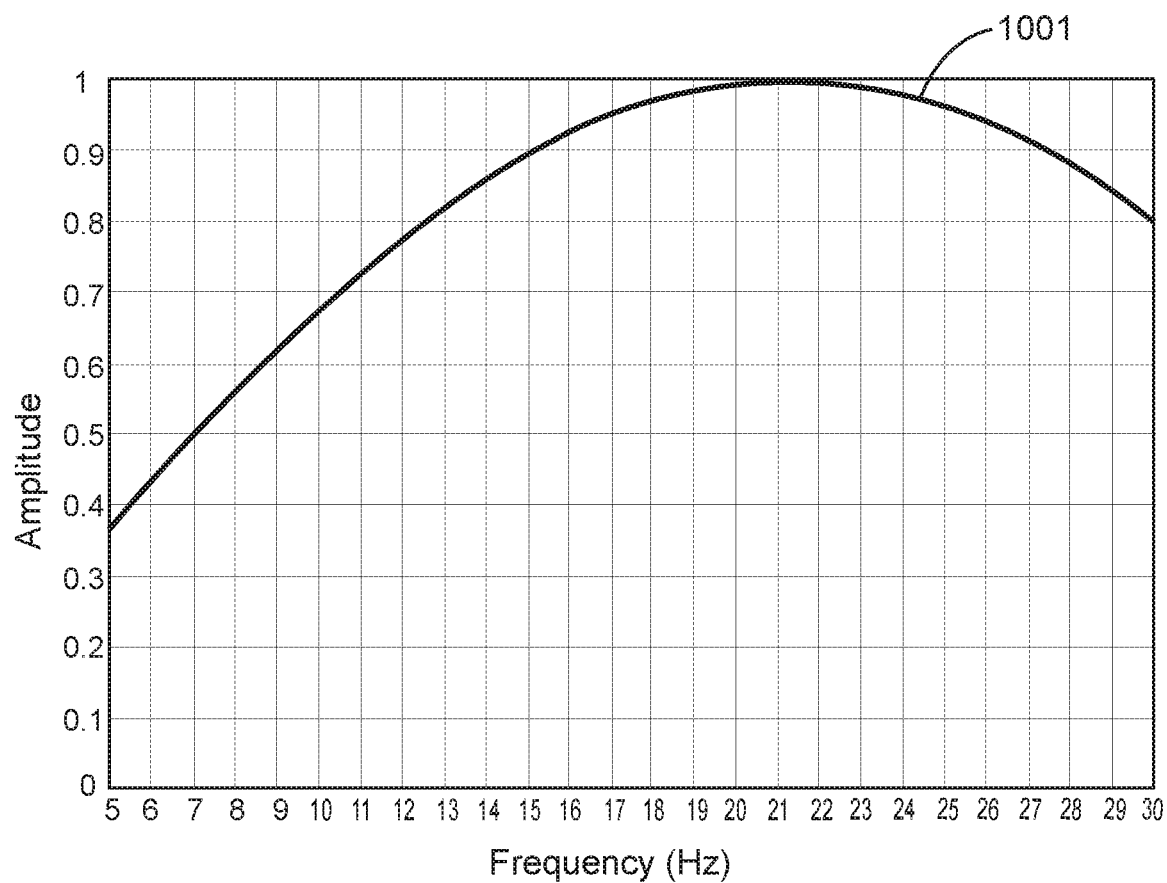
FIG. 10 illustrates the estimated resultant amplitude spectrum of the source array.

Continuing with the vibrator inline source array example discussed above, assume that it is desired to generate a spectrally flat amplitude spectrum for the downward propagating energy (θ=0) using a 10 s swept sine-wave sweep with a bandwidth of about 5-30 Hz. The desired far-field normalized target spectrum is $S_t(\omega_v)$ and thus, for this example $\|S_t(\omega_v)\|=1$. FIG. 10 shows the estimated resultant amplitude spectrum $\|S_1(\omega_v)\|$ 1001, which would be measured at, for example, a distance 1,000 m from the center of the source array. Other distances can be used. The estimated resultant amplitude spectrum 1001 is calculated based on the drive filters illustrated in FIGS. 9A and 9B assuming there are no system constraints and that the pilot signal that was used to produce the drive signals is spectrally flat. Graph 1001 has been normalized to unity at its maximum. Note that this is not a flat response, due primarily to the surface reflection, so the pilot signal will most likely have to dwell longer at both the low end of the spectrum and at the upper end of the spectrum to achieve a flat ESD due not only to the ghost effect, but also due to system constraints, as discussed next.

Figure 11:
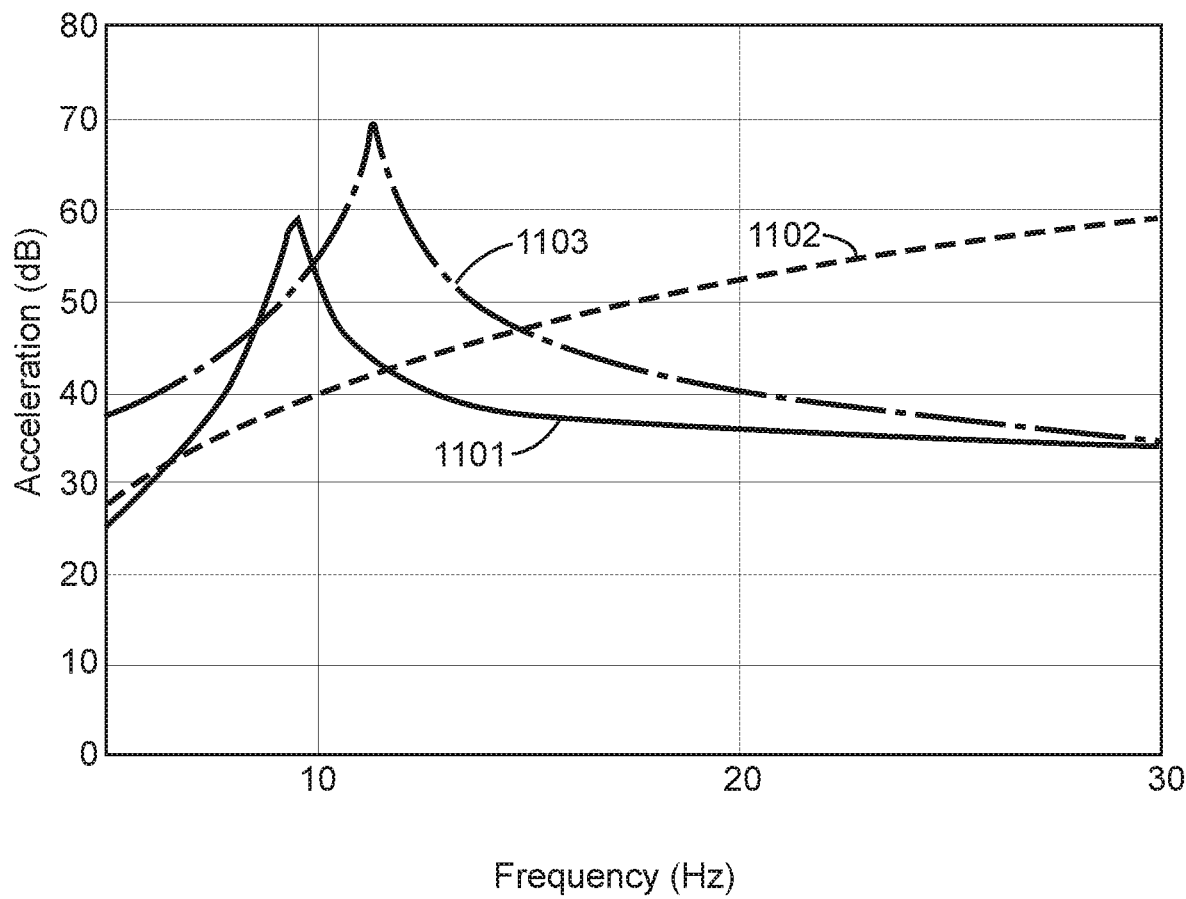
FIG. 11 illustrates various equipment constraints of the source array.

In this regard, FIG. 11 shows the constraints that current 1101, piston displacement 1102 and voltage 1103 impose on the maximum piston acceleration for the first source element in the six-element source array. Other constraints, for example, instantaneous power consumption (overheating concerns), nonlinear operating region, cavitation, piston velocity, etc. can also be imposed. The constraints are all plotted on a dB scale with 0 dB=1 m/s². The maximum current, displacement and voltage can be based upon manufacturer specifications and/or experimentation. In an embodiment, the constraint curves can be calculated/updated by numerically applying the maximum current, displacement and voltage to the various FRF transfer functions estimates $H^{A/I}$, $H^{A/X}$ and $H^{A/U}$, respectively. See for example, methods developed in U.S. Pat. Nos. 8,274,862, 8,619,497, and U.S. Patent Application Publication No. 2013/0100766.

For this example, it is assumed that the pilot signal will be a swept sine wave, which allows to ignore the impact of the frequency phase response of the vibrator on the constraints and the problem can be worked in the frequency domain. For arbitrary waveform pilot signals, for example, pseudorandom pilot signals, the phase response cannot be ignored and the pilot computation need to be performed in the time domain and typically requires an iterative approach, similar to that described in U.S. Pat. No. 8,619,947.

The response of each marine vibrator element will be different from the others, resulting in different peak acceleration constraint profiles. For example, the differences can be attributed to design differences, different loading effects due to source interaction, manufacture tolerances etc.

Because the entire source array is going to use a common pilot signal, and that pilot signal will be convolved with the drive filters to form drive the signals, the temporal amplitude of the pilot signal will be further constrained. In one application, the overall array acceleration constraint is generated by dividing (1) the overall constraint on peak acceleration for each vibrator element by (2) the corresponding drive filter gains $\|G_{i,v}\|$ at each frequency and then finding the resultant quotient minimum for the six vibrators at each frequency. The drive filter gain needs to be taken into account in case some vibrator elements are driven harder than others and to account for the amplitude variation with frequency. The amplitude of the pilot signal for a given frequency will be proportional to the overall array acceleration constraint, with the constant of proportionality determined by the vibrator controller transduction gain Kc. In an embodiment, the overall array acceleration constraint curve may be smoothed to avoid abrupt changes, potential control issues and potential correlation artifacts in the derived pilot signal. Also, if frequencies in the sweep lie between discrete frequencies $\omega_v$, a smoothed curve $S_c(f)$ with interpolated values may be generated, where f is the frequency in Hz.

Next, the corresponding sweep rate $S_r(f)$ needs to be computed for each frequency. Equation (18) indicates one possibility for computing the sweep rate at each frequency (Hz):

$$S_r(f) = K_s \cdot Q(f), \qquad (18)$$

where $$Q(f) = \frac{\|S_1(f)\|^2 \|S_c(f)\|^2}{\|S_t(f)\|^2}, \qquad (19)$$

with $S_1$, $S_c$ and $S_t$ as defined earlier. In this example, the target normalized spectrum $\|S_t(f)\|^2=1$. If not all discrete frequencies to be used in the sweep were included in earlier calculation of $S_c$, some form of smoothing and/or interpolation can be performed on $S_1$ and $S_c$ to handle intermediate frequency values (note that for convenience the frequencies have been converted to Hz). The constant of proportionality can be computed based upon the desired sweep length. For this example, the sweep length is about 8.2 s and it can be computed using equation (20), based upon the average relative dwell time per frequency, $$K_s = (BW/[SL(N_f)]) \cdot (\Sigma_{i_a=1, \ldots, N_f} 1/Q(f_{ia})), \qquad (20)$$

where BW is the sweep bandwidth (for example BW=30 Hz-5 Hz=25 Hz), SL is the desired sweep length (for this example SL=8.192 s) and $N_f$ are the number of discrete frequencies that are to be used in this computation with is being the frequency index and $f_{ia}$ an instantaneous discrete frequency.

Figure 12A:
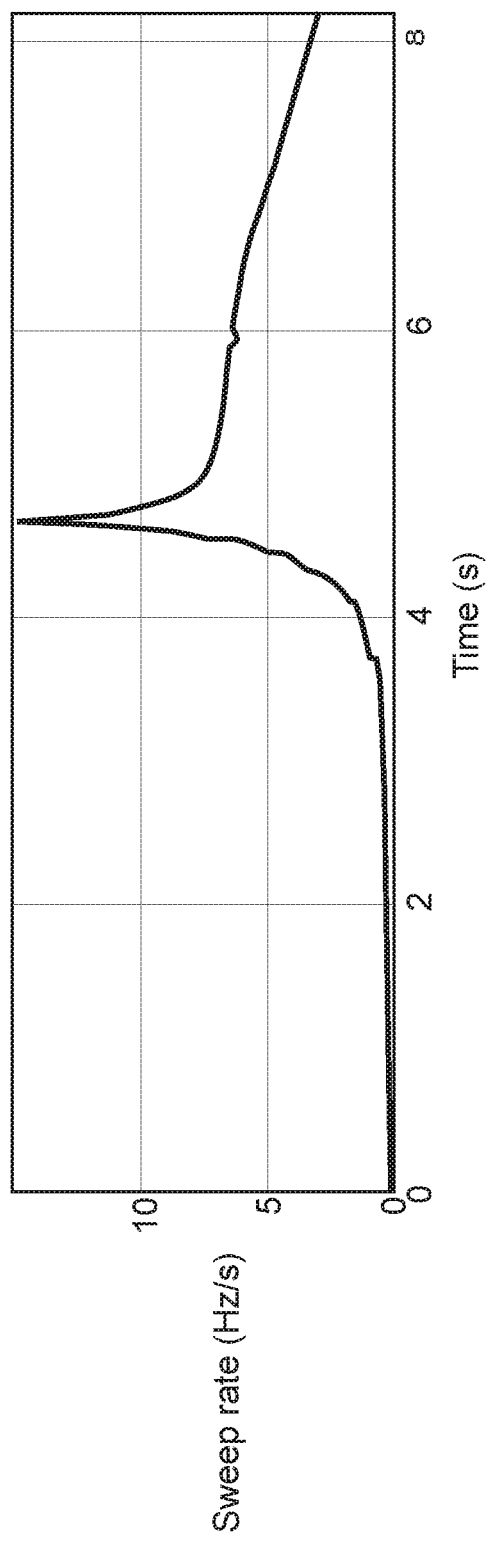
FIG. 12A illustrates the sweep rate and FIG. 12B illustrates the frequency of the sweep for the source array.
Figure 12B:
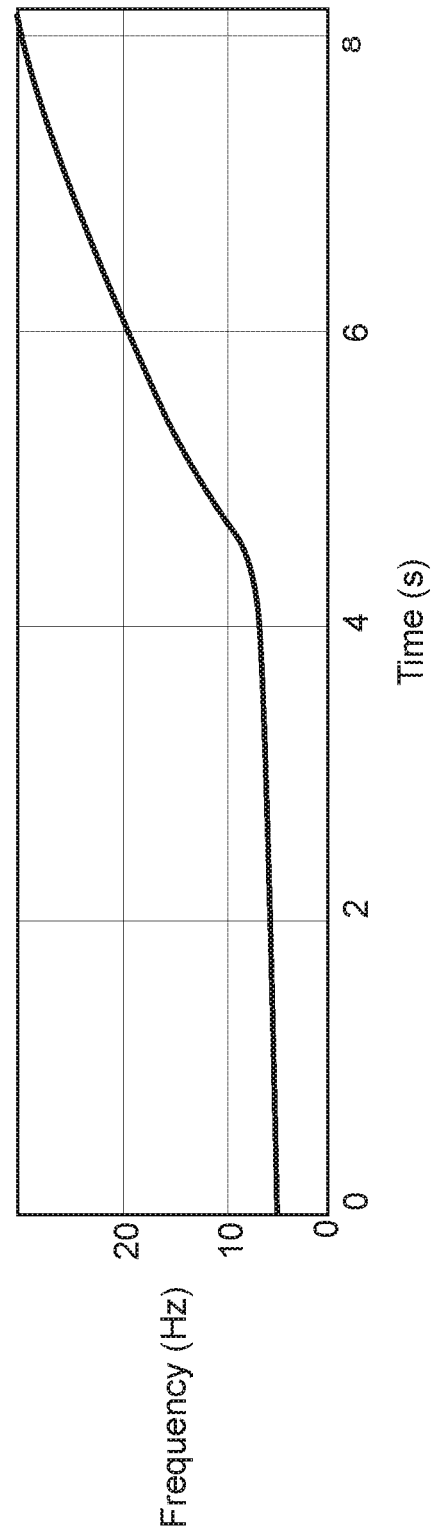

Using the starting frequency as the initial condition, for a given sample interval, equation (18) can be numerically integrated to compute the instantaneous frequency versus time profile. FIG. 12B shows the resulting frequency profile for the current example and the accompanying graph in FIG. 12A shows the instantaneous sweep rate versus time.

A numerical integration of the instantaneous frequency in the time domain may be used to compute the instantaneous phase of the sweep. A phase offset can also be applied rather than starting with an initial condition of zero phase. The sine of the instantaneous phase is multiplied by the source array amplitude constraint for that instantaneous frequency $S_c(f)$ and, in most cases, some form of taper may be applied to the beginning and end of the sweep, typically of a short duration (0.1 to 0.5 s) with an additional pilot scaling factor applied. The appropriate pilot-scaling factor is based upon the maximum output value of a DAC (digital analog converter) that interfaces the sweep computer and the controller in combination with the controller transduction gain Kc.

Having explained one way of adjusting the pilot and/or drive signals for step 341, the method may proceed to step 331 and confirm that the adjustment was successful. In an embodiment, not shown in FIG. 3, it is possible to include a counter to keep track of how many times the re-enter block 341 and then, if the count exceeds some threshold, the method may abort the calibration process and decides whether or not the survey can proceed.

Returning to the method of FIG. 3, assuming that the output at step 339 was positive and the survey is in progress and ongoing at step 343, receivers 209 are regularly monitored, and their outputs compared in step 345, as before in step 335, to determine whether or not the illumination requirements are being met. The monitor interval may be selected for every shot point. A longer monitor interval may also be selected. The selection of the monitor interval may be dictated, in part, by how quickly computations can be made. If the error determined in step 345 is determined in step 347 to be significant, or an error trend is observed, then the pilot and/or drive signals may require another adjustment and the routine loops back to step 341. If minimal or no errors are determined in step 345, then the result of step 347 it to proceed to step 349 and determine whether the survey is complete. The result of this determination in analyzed in step 351. If the survey is not complete, the method loops back to step 343 and the survey continues. If the survey is complete, then the method terminates at step 353.

Method 300 depicts various pathways encountered during the calibration process and subsequent monitoring of the output of the source elements or source array during the survey. If before or during the survey, equipment failure has been detected, for example during step 325 or step 335 or step 345, then, if for example, there are no equipment spares available, it may become necessary to reconfigure the survey's equipment and or survey parameters to achieve a satisfactory result in that event. In this case, for example, it may become necessary to revisit the illumination requirements in step 301 and/or select a different array geometry in step 303 and basically re-initiate the whole calibration process 300.

In another embodiment, a dimension of the source array may be dynamic and varied within a shot point interval. For example, the depth of a vibrator element may be changed to exploit the surface reflection. Alternatively, or in addition, it is possible to change the length, width and depth of the source array to provide a form of frequency scaling of the array as a means to preserve the directivity response or for other reasons. This kind of dimensional tuning is best suited for surveys that employ vibrator elements that can easily be individually positioned rather than having multiple vibrator elements towed together at a fixed spacing. Also, this dimensional tuning of the source array is better achieved where the sweep rates are low and/or instead of sweeping, a programmed set of monotone frequencies are stepped through to allow time for the source array to reconfigure itself.

In another embodiment, the vibrator elements have a first source array geometry and execute a first sweep covering a first range of frequencies, which can be emitted as a narrow bandwidth sweep. Then, the vibrator elements are reconfigured to occupy a second source array geometry and execute a second sweep covering a second range of frequencies, which can be emitted as a narrow bandwidth sweep and so on. The second source array geometry can resemble the first source array geometry in shape, but have changed in one dimension and can include a change in the operating depth.

Figure 13:
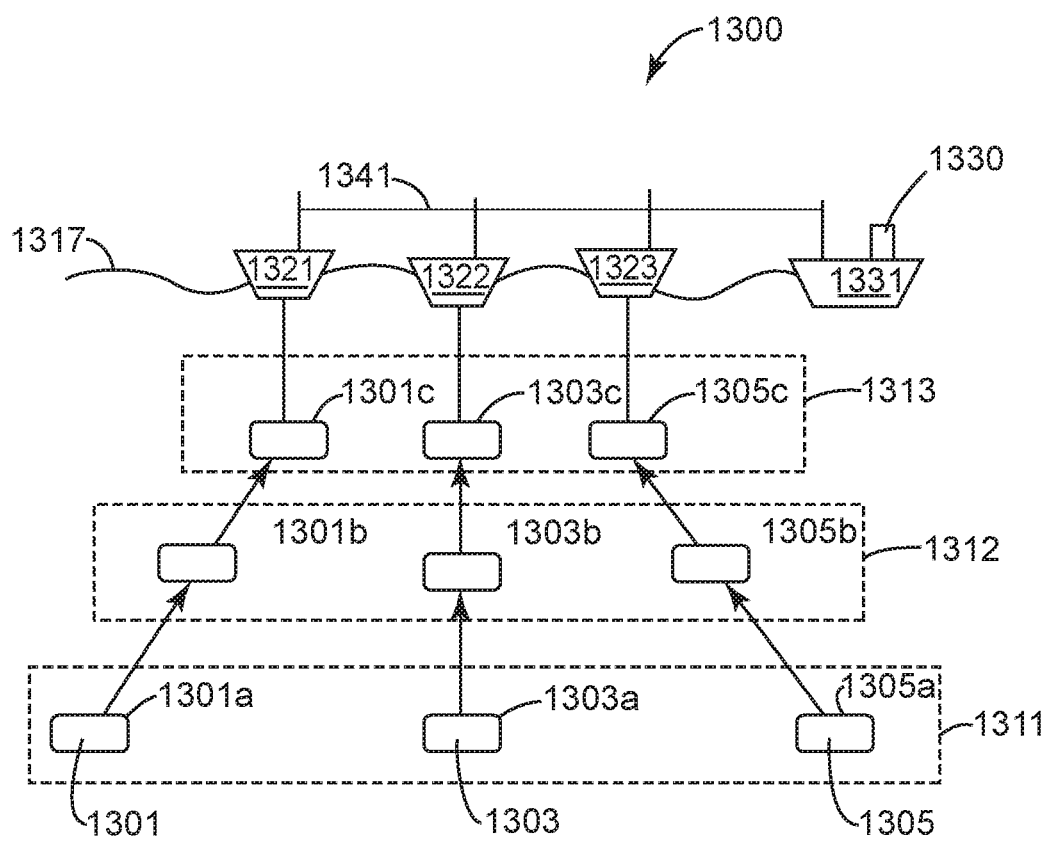
FIG. 13 illustrates a source array with adjustable source elements.

The source array can be configured to act as a 2D source array or as a 3D source array. FIG. 13 schematically depicts an adjustable source array 1300. If a survey is to be conducted using the adjustable source array 1300, then, in an embodiment, unique drive signal filters and pilot signals can be computed for each source array configuration and updated as required. If, for example, a single sweep is to emitted and the source array element arrangement changes continuously (continuous mode), with, for example, the frequency, then, in an embodiment, the drive filter coefficients are computed for a first source array configuration and a second suite of drive filter coefficients are computed for a second source array configuration.

For the case where the source array geometry changes dynamically during a continuous sweep (continuous mode), in an embodiment, interpolation techniques are used to dynamically compute the drive filter coefficients for the intermediate positions occupied by the vibrator elements as they move from a first source array configuration to a second source array configuration.

FIG. 13 shows three vibrators 1301, 1303 and 1305 that are suspended and/or towed from surface vessels 1321, 1322 and 1323, respectively, with the water surface being 1317. In an embodiment, vessels 1321, 1322 and 1323 are unmanned, but under the control of a management system 1330 located on manned vessel 1331. Management system 1330 may be in wireless communication with the vibrator elements through a bi-directional communication pathway 1341 through the use of transceivers located on each vessel (not shown). At a first frequency or range of frequencies, the vibrator elements occupy positions 1301a, 1303a and 1305a in configuration 1311. At a second frequency or range of frequencies, the vibrator elements move to occupy positions 1301b, 1303b and 1305b in configuration 1312. At a third frequency or range of frequencies, the vibrator elements move to occupy positions 1301c, 1303c and 1305c in configuration 1313 and so on. As was stated before, the vibrators can operate in a "stepwise mode" or "continuous mode".

Vessels 1321, 1322 and 1323 may be equipped with GPS receivers for positioning feedback, vibrator deployment equipment such as a winch, semi-autonomous propulsion system for repositioning and so on to facilitate moving the vibrator elements to new positions.

Figure 14:
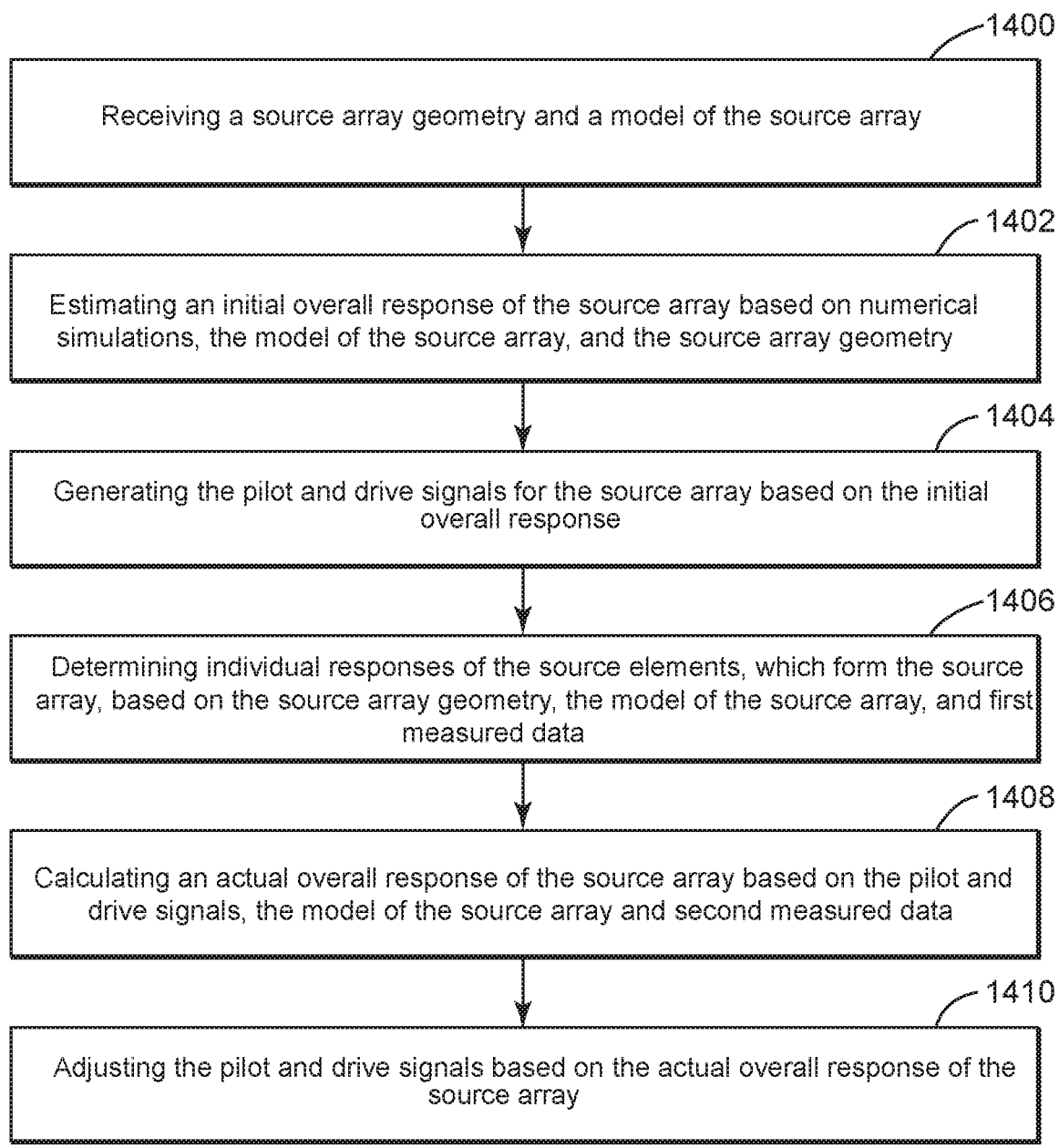
FIG. 14 illustrates a method for pilot and drive signal adjustment.

According to an embodiment, there is a method for calibrating pilot and drive signals of a marine seismic source array using measured data. The method, as illustrated in FIG. 14, includes a step 1400 of receiving a source array geometry and a model of the source array, a step 1402 of estimating an initial overall response of the source array based on numerical simulations, the model of the source array, and the source array geometry, a step 1404 of generating the pilot and drive signals for the source array based on the initial overall response, a step 1406 of determining individual responses of the source elements, which form the source array, based on the source array geometry, the model of the source array, and first measured data, a step 1408 of calculating an actual overall response of the source array based on the pilot and drive signals, the model of the source array and second measured data, and a step 1410 of adjusting the pilot and drive signals based on the actual overall response of the source array.

The first and second measured data is recorded with sensors located on the source array while the source array is deployed in water. The first measured data is indicative of an individual behavior of a single source element while the second measured data is indicative of a collective behavior of plural source elements.

The method may further include a step of comparing the actual overall response of the source array with a given response, wherein the given response is a target energy spectral density for the source array, or the given response is a target energy spectral density and a target beam directivity of the source array or the given response is a target beam directivity of the source array.

The method may further include a step of applying random pilot and drive signals for obtaining the individual responses of the source elements, and/or transmitting the calibrated pilot and drive signals to the source elements, and/or performing a seismic survey in a marine environment with the calibrated pilot and drive signals, and/or driving each source element of the source array with a corresponding calibrated drive signal.

The above embodiments were discussed without specifying the type of seismic receivers used to record seismic data. In this sense, it is known in the art to use, for a marine seismic survey, streamers towed by one or more vessels, and the streamers include seismic receivers. The streamers may be horizontal, slanted or have a curved profile as disclosed, for example, in U.S. Pat. Nos. 8,456,951 and 8,451,682, the entire contents of which are incorporated herein by reference.

Figure 15:
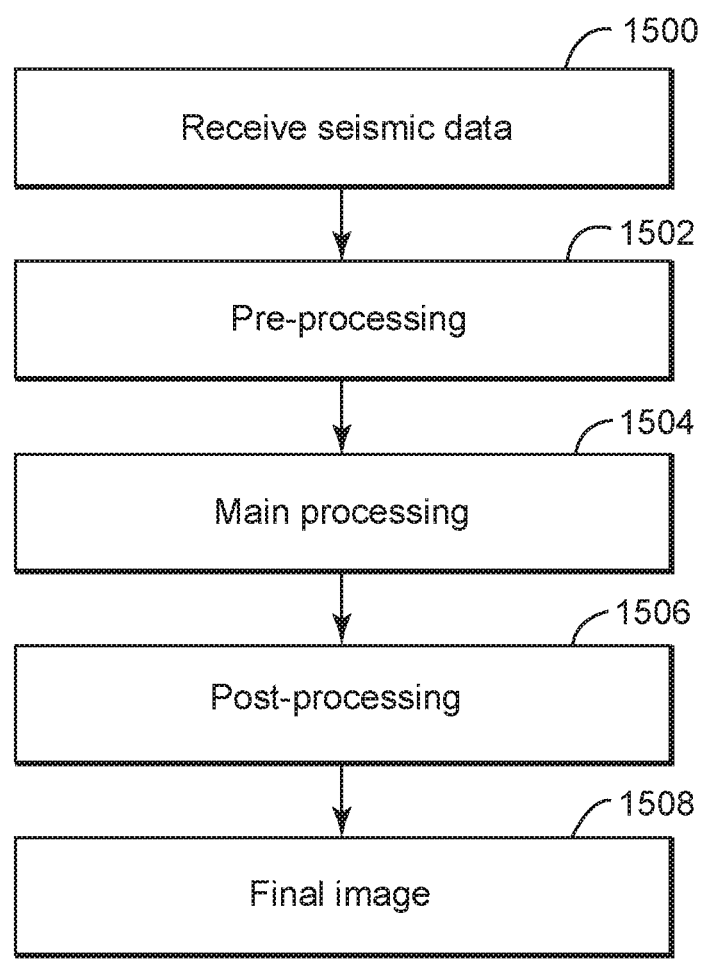
FIG. 15 is a flowchart of a method for processing seismic data.

Seismic data generated by the seismic sources discussed above and acquired with the streamers also noted above may be processed in a corresponding processing device for generating an image of the surveyed subsurface as discussed now with regard to FIG. 15. For example, the seismic data generated with the source elements as discussed above may be received in step 1500 at the processing device. In step 1502, pre-processing methods are applied, e.g., demultiple, signature deconvolution, trace summing, motion correction, vibroseis correlation, resampling, etc. In step 1504, the main processing takes place, e.g., deconvolution, amplitude analysis, statics determination, common middle point gathering, velocity analysis, normal move-out correction, muting, trace equalization, stacking, noise rejection, amplitude equalization, etc. In step 1506, final or post-processing methods are applied, e.g., migration, wavelet processing, seismic attribute estimation, inversion, etc.; in step 1508 the final image of the subsurface is generated.

Figure 16:
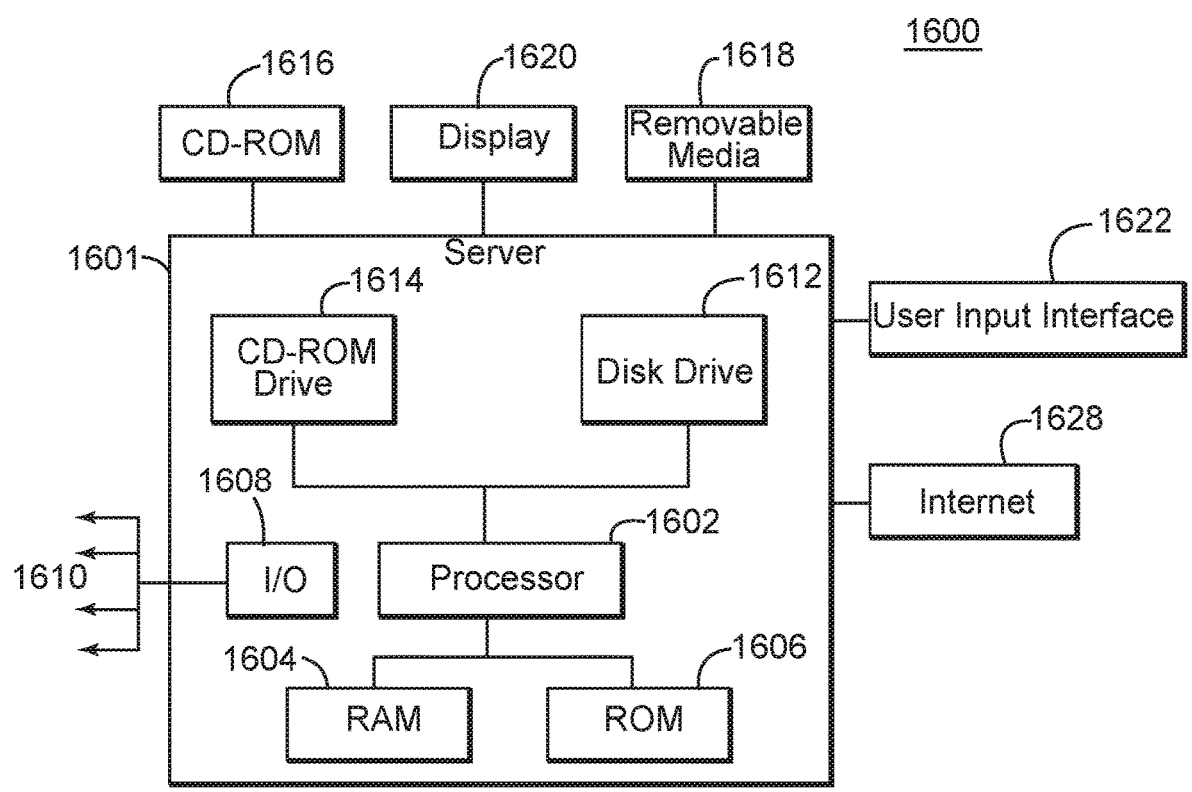
FIG. 16 is a schematic diagram of a control device.

An example of a representative processing device (e.g., controller 126) capable of carrying out operations in accordance with the embodiments discussed above is illustrated in FIG. 16. Such a processing device may be any of the controllers discussed in the previous embodiments. Hardware, firmware, software or a combination thereof may be used to perform the various steps and operations described herein.

The exemplary processing device 1600 suitable for performing the activities described in the exemplary embodiments may include server 1601. Such a server 1601 may include a central processor unit (CPU) 1602 coupled to a random access memory (RAM) 1604 and/or to a read-only memory (ROM) 1606. The ROM 1606 may also be other types of storage media to store programs, such as programmable ROM (PROM), erasable PROM (EPROM), etc. Processor 1602 may communicate with other internal and external components through input/output (I/O) circuitry 1608 and bussing 1610 to provide control signals and the like. For example, processor 1602 may communicate with the various elements of each source element. Processor 1602 carries out a variety of functions as are known in the art, as dictated by software and/or firmware instructions.

Server 1601 may also include one or more data storage devices, including disk drives 1612, CD-ROM drives 1614, and other hardware capable of reading and/or storing information, such as a DVD, etc. In one embodiment, software for carrying out the above-discussed steps may be stored and distributed on a CD-ROM 1616, removable media 1618 or other form of media capable of storing information. The storage media may be inserted into, and read by, devices such as the CD-ROM drive 1614, disk drive 1612, etc. Server 1601 may be coupled to a display 1620, which may be any type of known display or presentation screen, such as LCD, plasma displays, cathode ray tubes (CRT), etc. A user input interface 1622 is provided, including one or more user interface mechanisms such as a mouse, keyboard, microphone, touch pad, touch screen, voice-recognition system, etc.

Server 1601 may be coupled to other computing devices, such as the equipment of a vessel, via a network. The server may be part of a larger network configuration as in a global area network (GAN) such as the Internet 1628, which allows ultimate connection to various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

This written description uses examples of the subject matter disclosed to enable any person skilled in the art to practice the same, including making and using any devices or systems and performing any incorporated methods. For greater clarity, the figures used to help describe the invention are simplified to illustrate key features. For example, figures are not to scale and certain elements may be disproportionate in size and/or location. The patentable scope of the subject matter is defined by the claims, and may include other examples that occur to those skilled in the art. Such other examples are intended to be within the scope of the claims. Those skilled in the art would appreciate that features from any embodiments may be combined to generate a new embodiment.

The disclosed embodiments provide a source array, seismic vibro-acoustic source elements, a system for conducting a marine geophysical survey that includes a means for identifying the responses of the source array elements, monitoring and adjusting the pilot and/or drive signals that achieves one or more desired features, e.g., beam directivity, energy spectral density, etc. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for calibrating pilot and drive signals of a marine seismic source array using measured data, the method comprising:
   receiving a source array geometry and a model of the source array;
   estimating an initial overall response of the source array based on source emission simulations using the model of the source array and the source array geometry;
   generating pilot and drive signals for the source array based on the initial overall response;
   determining individual responses of source elements, which form the source array, based on the source array geometry, the model of the source array, and first measured data indicative of individual behavior of the source elements;
   calculating an actual overall response of the source array to the pilot and drive signals, using the model of the source array and second measured data indicative of a collective behavior of the source elements; and
   adjusting the pilot and drive signals so that the actual overall response of the source array to calibrated pilot and drive signals meets a target emission objective.

2. The method of claim 1, wherein the first and second measured data is recorded with sensors located on the source array while the source array is deployed in water.

3. The method of claim 1, wherein the step of adjusting further comprises:
   comparing the actual overall response of the source array with a given response corresponding to the target emission objective.

4. The method of claim 3, wherein the given response is a target energy spectral density for the source array.

5. The method of claim 3, wherein the given response is a target energy spectral density and a target beam directivity of the source array.

6. The method of claim 3, wherein the given response is a target beam directivity of the source array.

7. The method of claim 1, wherein the step of determining individual responses of the source elements comprises:
   applying independent pilot and drive signals for obtaining the individual responses of the source elements.

8. The method of claim 1, further comprising:
   transmitting the calibrated pilot and drive signals to the source elements.

9. The method of claim 1, further comprising:
   performing a seismic survey in a marine environment with the calibrated pilot and drive signals.

10. The method of claim 1, further comprising:
    driving each source element of the source array with a corresponding calibrated drive signal.

11. The method of claim 1, wherein an error analysis of the individual responses relative to expected responses enables adjusting the source array geometry and/or the model of the source array.

12. A controller for calibrating pilot and drive signals of a marine seismic source array using measured data, the controller comprising:
    an interface configured to receive a source array geometry and a model of the source array; and
    a processor connected to the interface and configured to,
    estimate an initial overall response of the source array based on source emission simulations using the model of the source array; and the source array geometry;
    generate pilot and drive signals for the source array based on the initial overall response;
    determine individual responses of source elements, which form the source array, based on the source array geometry, the model of the source array, and first measured data indicative of individual behavior of the source elements;
    calculate an actual overall response of the source array to the pilot and drive signals, using the model of the source array and second measured data indicative of a collective behavior of the source elements; and
    adjust the pilot and drive signals so that the actual overall response of the source array to calibrated pilot and drive signals meets a target emission objective.

13. The controller of claim 12, wherein the first and second measured data is recorded with sensors located on the source array while the source array is deployed in water.

14. The controller of claim 12, wherein the processor is further configured to:
    compare the actual overall response of the source array with a given response corresponding to the target emission objective.

15. The controller of claim 14, wherein the given response is a target energy spectral density for the source array.

16. The controller of claim 14, wherein the given response is a target energy spectral density and a target beam directivity of the source array.

17. The controller of claim 14, wherein the given response is a target beam directivity of the source array.

18. The controller of claim 12, wherein the processor is further configured to:
    apply independent pilot and drive signals for obtaining the individual responses of the source elements.

19. The controller of claim 12, wherein an error analysis of the individual responses relative to expected responses enables adjusting the source array geometry and/or the model of the source array.

20. A non-transitory computer-readable medium storing instructions, which when executed by a processor, implement a method for calibrating pilot and drive signals of a marine seismic source array using measured data, the instructions comprising:
- receiving a source array geometry and a model of the source array;
- estimating an initial overall response of the source array based on source emission simulations using the model of the source array and the source array geometry;
- generating pilot and drive signals for the source array based on the initial overall response;
- determining individual responses of source elements, which form the source array, based on the source array geometry, the model of the source array, and first measured data indicative of individual behavior of the source elements;
- calculating an actual overall response of the source array to the pilot and drive signals, using the model of the source array and second measured data indicative of a collective behavior of the source elements; and
- adjusting the pilot and drive signals so that the actual overall response of the source array to calibrated pilot and drive signals meets a target emission objective.

\* \* \* \* \*